(12) United States Patent
Babaei et al.

(10) Patent No.: US 11,310,775 B2
(45) Date of Patent: *Apr. 19, 2022

(54) DISCARDING A DUPLICATE PACKET OF AN RLC ENTITY IN RESPONSE TO AN ACKNOWLEDGEMENT

(71) Applicant: Samsung Electronics Co., Ltd., Suwon-si (KR)

(72) Inventors: Alireza Babaei, Fairfax, VA (US); Esmael Dinan, McLean, VA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/925,035

(22) Filed: Jul. 9, 2020

(65) Prior Publication Data

US 2020/0344723 A1    Oct. 29, 2020

Related U.S. Application Data

(63) Continuation of application No. 15/933,807, filed on Mar. 23, 2018, now Pat. No. 10,716,094.

(Continued)

(51) Int. Cl.
*H04W 72/04* (2009.01)
*H04W 72/14* (2009.01)
(Continued)

(52) U.S. Cl.
CPC .............. *H04W 72/04* (2013.01); *H04L 1/00* (2013.01); *H04L 1/1848* (2013.01); *H04L 1/1874* (2013.01); *H04W 72/14* (2013.01)

(58) Field of Classification Search
CPC . H04L 47/32; H04L 1/08; H04L 1/189; H04L 1/22; H04L 2001/0096; H04L 1/00;
(Continued)

(56) References Cited

U.S. PATENT DOCUMENTS

| 6,700,871 B1* | 3/2004 | Harper | H04L 1/1877 370/230 |
|---|---|---|---|
| 2009/0097425 A1* | 4/2009 | Sammour | H04L 1/1841 370/310 |

(Continued)

OTHER PUBLICATIONS

3GPP TR 38.804 V0.5.1 (Feb. 2017); 3rd Generation Partnership Project; Technical Specification Group Radio Access Network; Study on New Radio Access Technology; Radio Interface Protocol Aspects (Release 14).

(Continued)

*Primary Examiner* — Wutchung Chu
(74) *Attorney, Agent, or Firm* — Jefferson IP Law, LLP

(57) ABSTRACT

A wireless device receives an indication for activation of packet data convergence protocol (PDCP) packet duplication of a radio bearer associated with a first radio link control (RLC) entity and a second RLC entity. A packet of the radio bearer is duplicated. The packet to the first RLC entity is provided. A duplicate packet to the second RLC is provided. The packet of the first RLC entity is transmitted. An acknowledgement of a successful delivery for the packet of the first RLC entity is received. In response to the acknowledgement, the duplicate packet of the second RLC entity is discarded.

18 Claims, 17 Drawing Sheets

Related U.S. Application Data

(60) Provisional application No. 62/475,600, filed on Mar. 23, 2017.

(51) Int. Cl.
*H04L 1/00* (2006.01)
*H04L 1/18* (2006.01)

(58) Field of Classification Search
CPC ... H04L 1/1848; H04L 1/1874; H04L 1/1867; H04L 1/1864; H04L 69/322; H04L 1/1832; H04L 1/203; H04L 47/27; H04L 1/16; H04L 1/18; H04L 1/1877; H04L 69/04; H04L 1/1809; H04L 1/1841; H04L 1/1896; H04L 1/1685; H04L 47/34; H04L 1/1887; H04L 47/10; H04L 1/1607; H04L 1/1621; H04L 29/06; H04L 1/181; H04L 1/1861; H04L 1/06; H04L 69/321; H04L 5/001; H04L 67/12; H04L 1/0078; H04L 1/1816; H04L 1/1822; H04L 5/0053; H04L 1/1812; H04L 1/1819; H04L 1/1854; H04W 76/15; H04W 72/04; H04W 72/14; H04W 36/02; H04W 28/04; H04W 28/06; H04W 76/32; H04W 80/06; H04W 28/065; H04W 28/02; H04W 80/02; H04W 24/10; H04W 28/08; H04W 72/048; H04W 36/0005; H04W 72/10; H04W 72/042; H04W 74/0833; H04W 28/0278; H04W 72/02; H04W 72/1284; H04W 74/0808; H04W 72/0413; H04W 72/1242; H04W 76/19; H04B 7/0695
See application file for complete search history.

(56) References Cited

U.S. PATENT DOCUMENTS

| | | | | |
|---|---|---|---|---|
| 2012/0014335 | A1* | 1/2012 | Adachi | H04W 72/0446 370/329 |
| 2012/0057560 | A1* | 3/2012 | Park | H04L 1/189 370/329 |
| 2012/0287790 | A1* | 11/2012 | Huang | H04W 28/10 370/236 |
| 2016/0149820 | A1* | 5/2016 | McGhee | H04L 43/12 370/230 |
| 2016/0302075 | A1* | 10/2016 | Dudda | H04W 12/106 |
| 2018/0132220 | A1* | 5/2018 | Jang | H04L 1/08 |
| 2018/0227219 | A1* | 8/2018 | Zhang | H04L 45/22 |
| 2019/0174353 | A1* | 6/2019 | Yilmaz | H04W 28/0278 |
| 2019/0200259 | A1* | 6/2019 | Shim | H04W 28/0273 |
| 2019/0239114 | A1* | 8/2019 | Martin | H04L 1/00 |
| 2019/0386779 | A1* | 12/2019 | Hong | H04L 5/0094 |
| 2020/0007281 | A1* | 1/2020 | Kilinc | H04W 36/0069 |
| 2020/0092746 | A1* | 3/2020 | Baek | H04W 28/085 |
| 2020/0145146 | A1* | 5/2020 | Decarreau | H04W 28/06 |
| 2021/0218507 | A1* | 7/2021 | Decarreau | H04L 1/1848 |

OTHER PUBLICATIONS

3GPP TS 36.211 V14.1.0 (Dec. 2016); 3rd Generation Partnership Project; Technical Specification Group Radio Access Network; Evolved Universal Terrestrial Radio Access (E-UTRA); Physical channels and modulation (Release 14).
3GPP TS 36.212 V14.1.0 (Dec. 2016); 3rd Generation Partnership Project; Technical Specification Group Radio Access Network; Evolved Universal Terrestrial Radio Access (E-UTRA); Multiplexing and channel coding (Release 14).
3GPP TS 36.213 V14.1.0 (Dec. 2016); 3rd Generation Partnership Project; Technical Specification Group Radio Access Network; Evolved Universal Terrestrial Radio Access (E-UTRA); Physical layer procedures (Release 14).
3GPP TS 36.300 V14.1.0 (Dec. 2016); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.1.0 (Dec. 2016); 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331; V14.1.0 (Dec. 2016)3rd Generation Partnership Project; Technical Specification Group Radio Access Network; Evolved Universal Terrestrial Radio Access (E-UTRA); Radio Resource Control (RRC); Protocol specification (Release 14).
R2-1700833; 3GPP TSG-RAN WG2 #97; Athens, Greece, Feb. 13-17, 2017; Agenda Item: 10.2.1.2; Source: Ericsson; Title: Data duplication in lower layers (HARQ); Document for: Discussion, Decision.
R2-1700905; 3GPP TSG-RAN WG2 #97; Athens, Greece, Feb. 13-17, 2017; Agenda Item: 10.2.1.2; Source: Ericsson; Title: Summary of RAN2 solutions for URLLC; Document for: Discussion.
R2-1700959; 3GPP TSG-RAN2 #97; Athens, Greece, Feb. 13-17, 2017; Agenda Item: 10.2.1.4; Source: OPPO; Title: HARQ operation in NR; Document for: Discussion, Decision.
R2-1700967; 3GPP TSG-RAN WG2 #97; Athens, Greece, Feb. 13-17, 2017; Source: CATT; Title: Packet Duplication in MAC; Agenda Item: 10.2.1.2; Document for: Discussion and Decision.
R2-1701057; 3GPP TSG-RAN WG2 #97; Feb. 13-17, 2017; Athens, Greece; Source: NTT Docomo, Inc.; Title: Clean-up and capturing missing agreements to TR 38.804; Document for: Discussion and decision; Agenda Item: 10.1.
R2-1701183; 3GPP TSG-RAN WG2 Meeting #97; Athens, Greece, Feb. 13-17, 2017; Agenda Item: 10.2.1.2; Source: InterDigital Communications; Title: Redundancy below PDCP for NR; Document for: Discussion, Decision.
R2-1701186; 3GPP TSG-RAN WG2 Meeting #97; Athens, Greece, Feb. 13-17, 2017; Agenda Item: 10.2.1.2; Source: InterDigital Communications; Title: Packet Duplication at PDCP; Document for: Discussion, Decision.
R2-1701201; 3GPP TSG-RAN2 Meeting #97; Athens, Greece, Feb. 13-17, 2017; Agenda item: 10.2.1.2; Source: Huawei, HiSilicon; Title: Redundancy Schemes below PDCP Layer; Document for: Discussion and Decision.
R2-1701462; 3GPP TSG-RAN WG2 #97; Athens, Greece, Feb. 13-Feb. 17, 2017; Agenda item: 10.2.1.2 (FS_NR_newRAT); Source: LG Electronics Inc.; Title: Packet duplication in PDCP; Document for: Discussion and Decision.
R2-1701542; 3GPP TSG-RAN WG2 Meeting #97; Athens, Greece, Feb. 13-17, 2017; Agenda Item: 10.2.1.2 (FS_NR_newRAT); Source: LG Electronics Inc.; Title: Packet duplication in CA; Document for: Discussion and Decision.
R2-1701720; 3GPP TSG-RAN WG2 97 meeting; Athens, Greece, Feb. 13-17, 2017; Agenda item: 10.2.1.2; Source: Intel Corporation; Title: Packet duplication for URLLC within a gNB; Document for: Discussion and Decision.
R2-1701846; 3GPP TSG-RAN WG2 #97; Athens, Greece, Feb. 13-17, 2017; Agenda Item: 10.2.2.5; Source: Huawei, HiSilicon; Title: Packet duplication for LTE-NR tight interworking; Document for: Discussion and Decision.
R2-1701861; 3GPP TSG-RAN WG2 Meeting #97; Athens, Greece, Feb. 13-17, 2017; Agenda item: 10.2.1.2; Source: Nokia, Alcatel-Lucent Shanghai Bell; Title: Discussion on the support for packet duplication; WID/SID: FS_NR_newRAT—Release 14; Document for: Discussion and Decision.
R2-1701986; 3GPP TSG-RAN WG2 Meeting #97; Athens, Greece, Feb. 13-17, 2017; Agenda item: 10.2.1.2; Source: Samsung; Title: Considerations on Packet Duplication for URLLC; Document for: Discussion & Decision.
R2-1702032; 3GPP TSG-RAN WG2 #97; Athens, Greece, Feb. 13-17, 2017; Revision of R2-1700833; Agenda Item: 10.2.1.2; Source: Ericsson; Title: Data duplication in lower layers (HARQ); Document for: Discussion, Decision.
3GPP TSG-RAN2 NR Ad Hoc R2-1700172; Spokane, Washington, US, Jan. 17-19, 2017; Agenda item: 3.2.1.1; Source: Huawei,

(56) References Cited

OTHER PUBLICATIONS

HiSilicon; Title: Evaluation on packet duplication in multi-connectivity Document for: Discussion and decision.

3GPP TSG-RAN WG2 NR Ad Hoc R2-1700192; Spokane, USA, Jan. 17-19, 2017; Source: CATT, Alcatel-Lucent Shanghai Bell, Nokia ; Title: Packet duplication across legs; Agenda Item: 3.2.1.1; Document for: Discussion and Decision.

3GPP TSG-RAN WG2 NR Ad Hoc R2-1700193; Spokane, USA, Jan. 17-19, 2017; Source: CATT; Title: Performance analysis of packet duplication; Agenda Item: 3.2.1.1; Document for: Discussion and Decision.

3GPP TSG-RAN WG2 NR Ad-hoc R2-1700336; Spokane, Washington, USA, Jan. 17-19, 2017; Agenda item: 3.2.1.2; Source: Intel Corporation; Title: Packet duplication for URLLC in DC and CA deployment Document for: Discussion and Decision.

3GPP TSG RAN WG2 AH_NR Meeting R2-1700373; Spokane, USA, Jan. 17-19, 2017; Agenda Item: 3.2.1.2; Source: KT Corp.; Title: Discussion on Multi-Connectivity data duplication for URLLC; Document for: Discussion and Decision.

3GPP TSG-RAN WG2 NR Ad Hoc R2-1700423; Spokane, USA, Jan. 17-19, 2017; Agenda Item : 3.2.1.1 (FS_ NR_newRAT); Source : LG Electronics Inc.; Title : Packet duplication in NR; Document for: Discussion and Decision.

3GPP TSG-RAN WG2 #AH Tdoc R2-1700428; Spokane, Washington, USA, Jan. 17-19, 2017; Agenda Item: 3.2.1.2; Source: Ericsson; Title: Data duplication and link selection for URLLC in NR; Document for: Discussion, Decision.

3GPP TSG-RAN WG2 NR Ad Hoc R2-1700611; Spokane, USA, Jan. 17-19, 2017; Agenda item: 3.2.1.1; Source: Samsung; Title: Efficiency of Packet Duplication for NR; Document for: Discussion & Decision.

3GPP TSG-RAN WG2 #97 Tdoc R2-1700834; Athens, Greece, Feb. 13-17 201; Agenda Item: 10.2.1.2; Source: Ericsson; Title: Further aspects of data duplication in PDCP layer; Document for: Discussion, Decision.

* cited by examiner

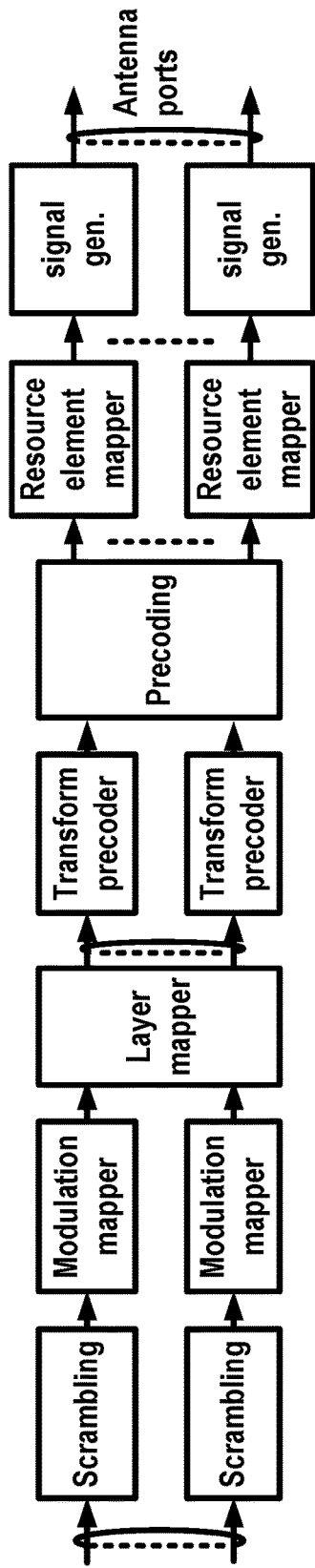
FIG. 4A
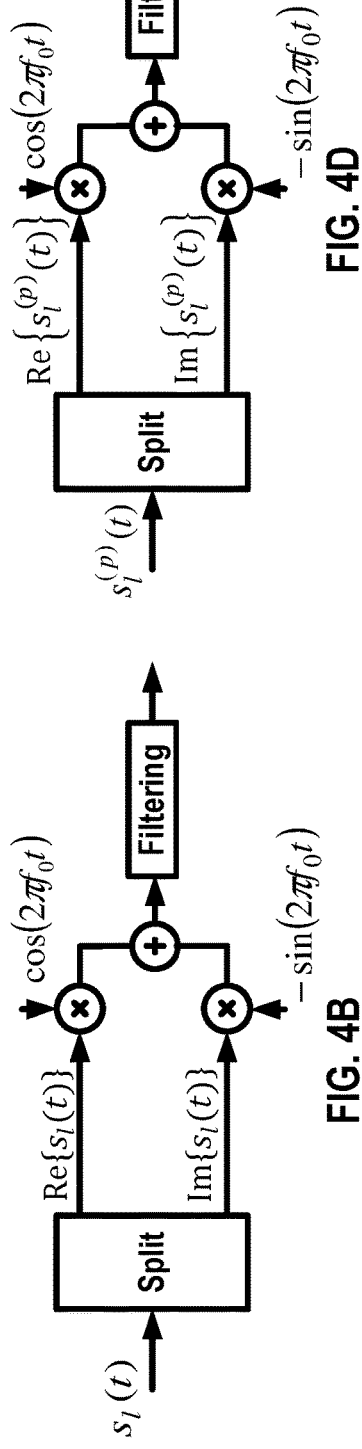
FIG. 4B
FIG. 4D
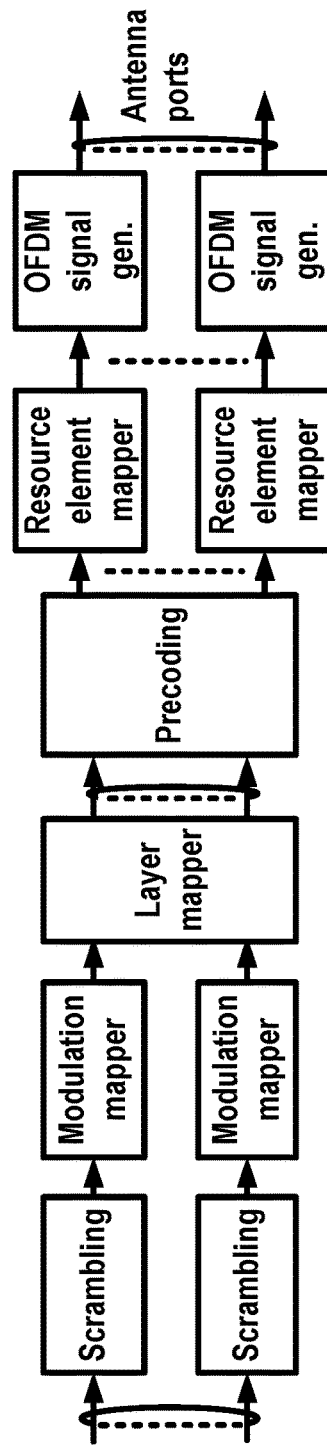
FIG. 4C

DISCARDING A DUPLICATE PACKET OF AN RLC ENTITY IN RESPONSE TO AN ACKNOWLEDGEMENT

CROSS-REFERENCE TO RELATED APPLICATIONS

This application is a continuation of U.S. patent application Ser. No. 15/933,807, filed Mar. 23, 2018, which claims the benefit of U.S. Provisional Application No. 62/475,600, filed Mar. 23, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
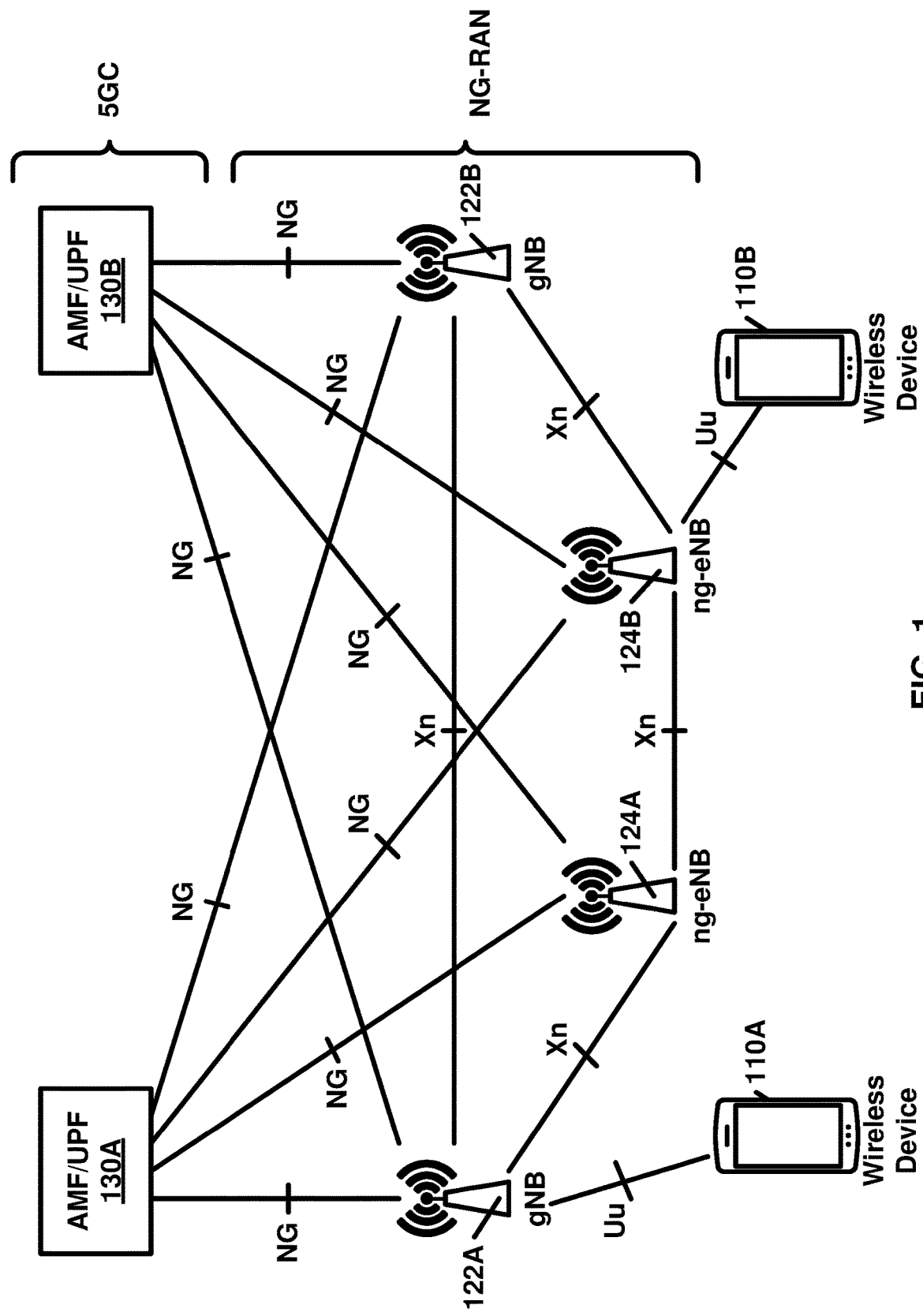
FIG. 1 is a diagram of an example RAN architecture as per an aspect of an embodiment of the present disclosure.

Example embodiments of the present disclosure enable operation of packet duplication. Embodiments of the technology disclosed herein may be employed in the technical field of multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
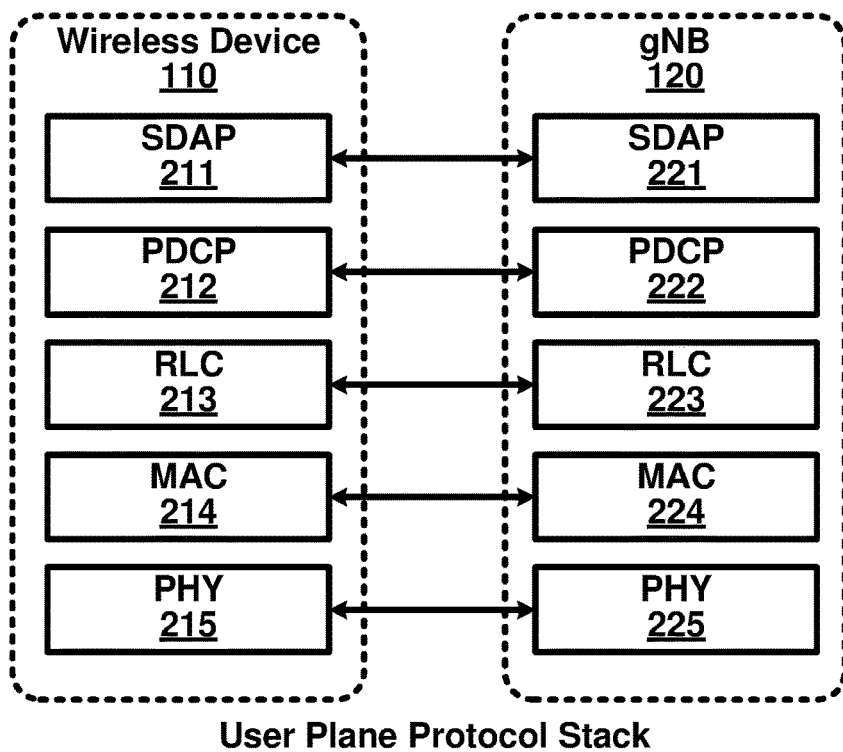
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
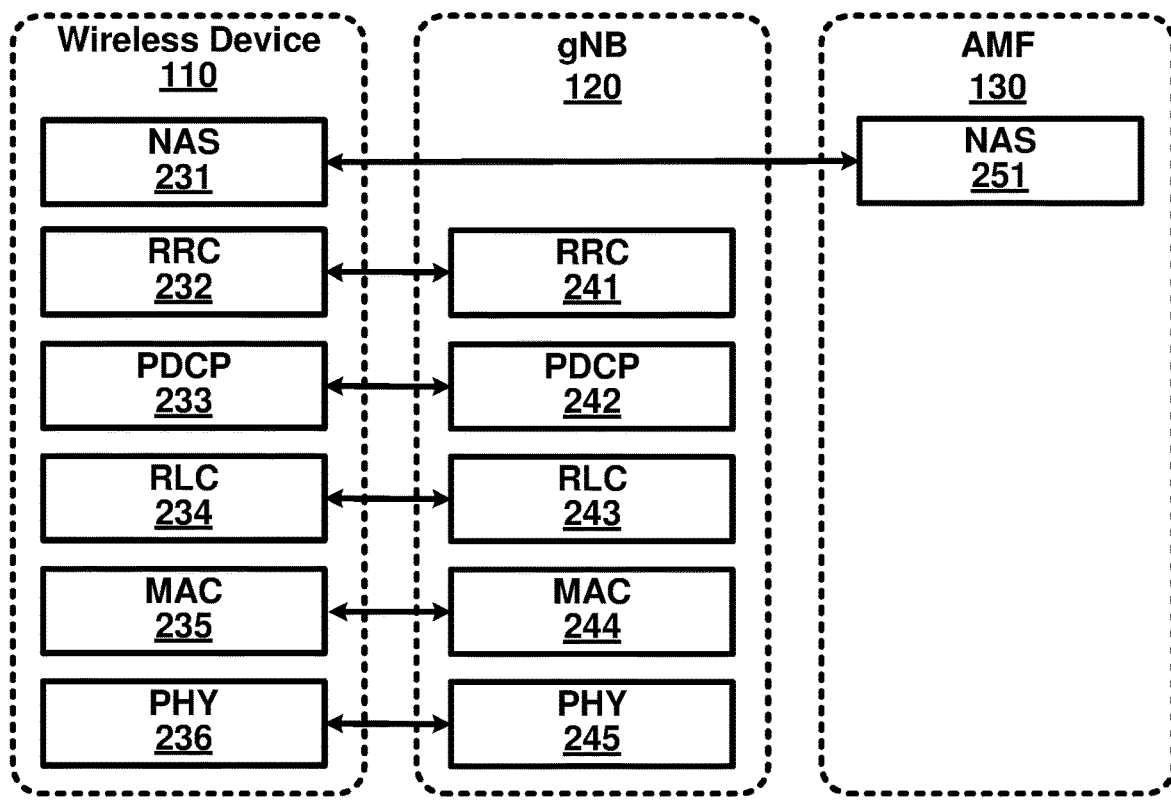
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
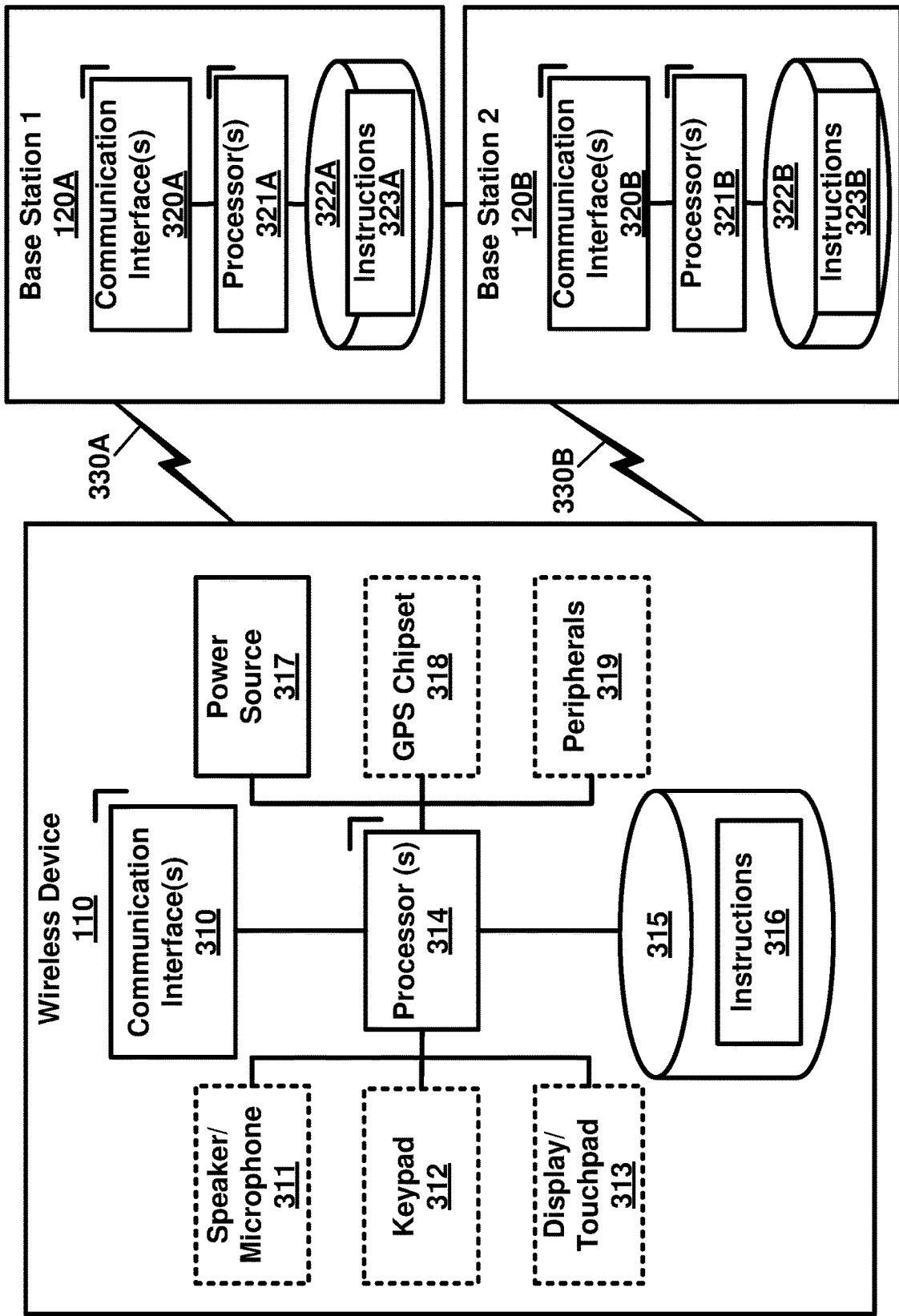
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
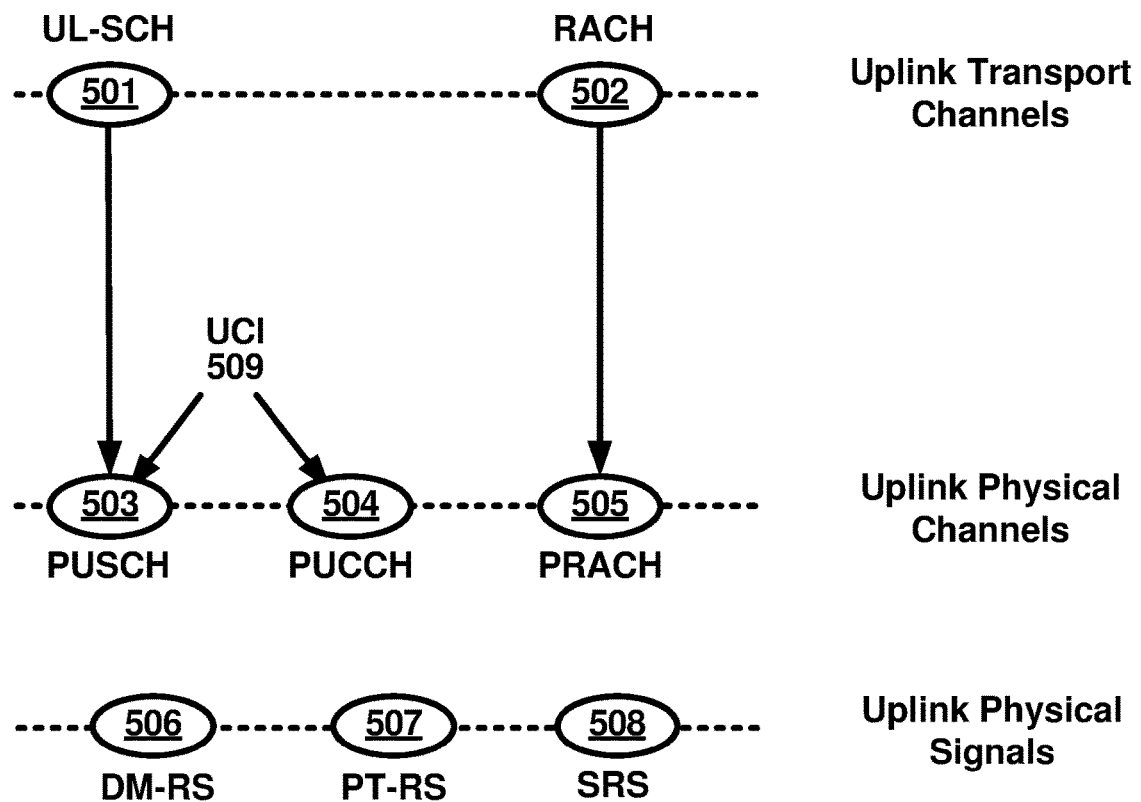
FIG. 5A is a diagram of an example uplink channel mapping and example uplink physical signals as per an aspect of an embodiment of the present disclosure.
Figure 5B:
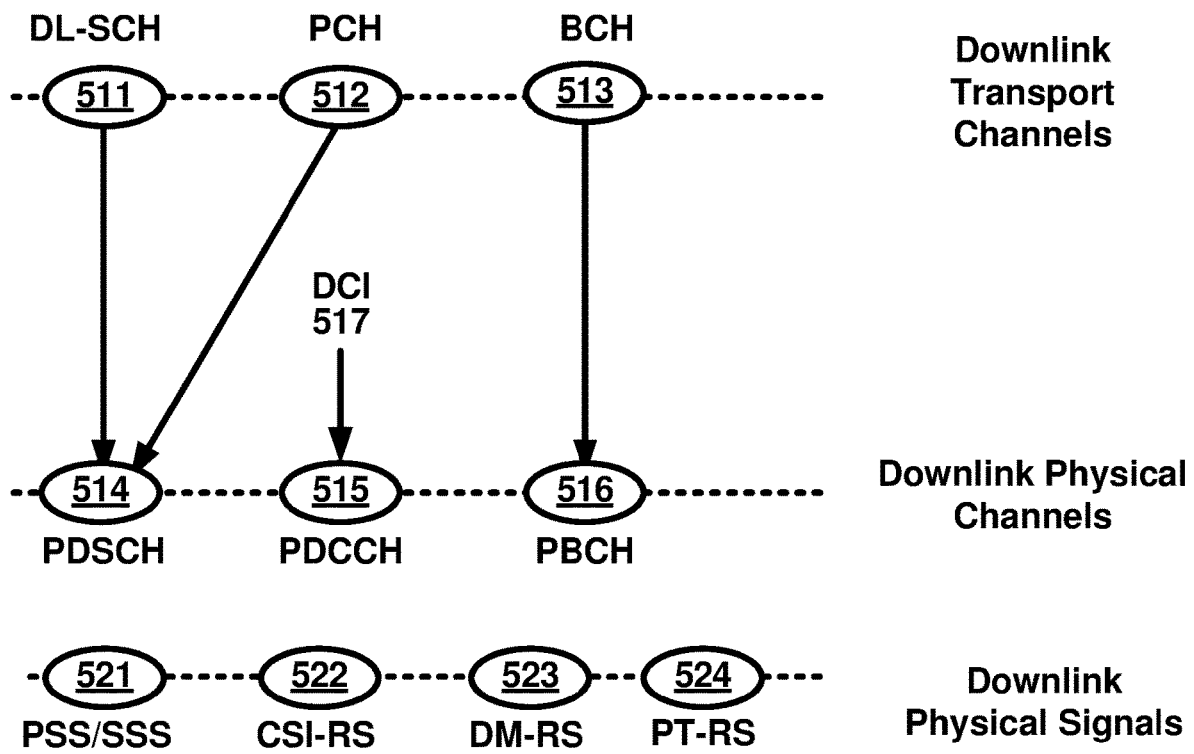
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
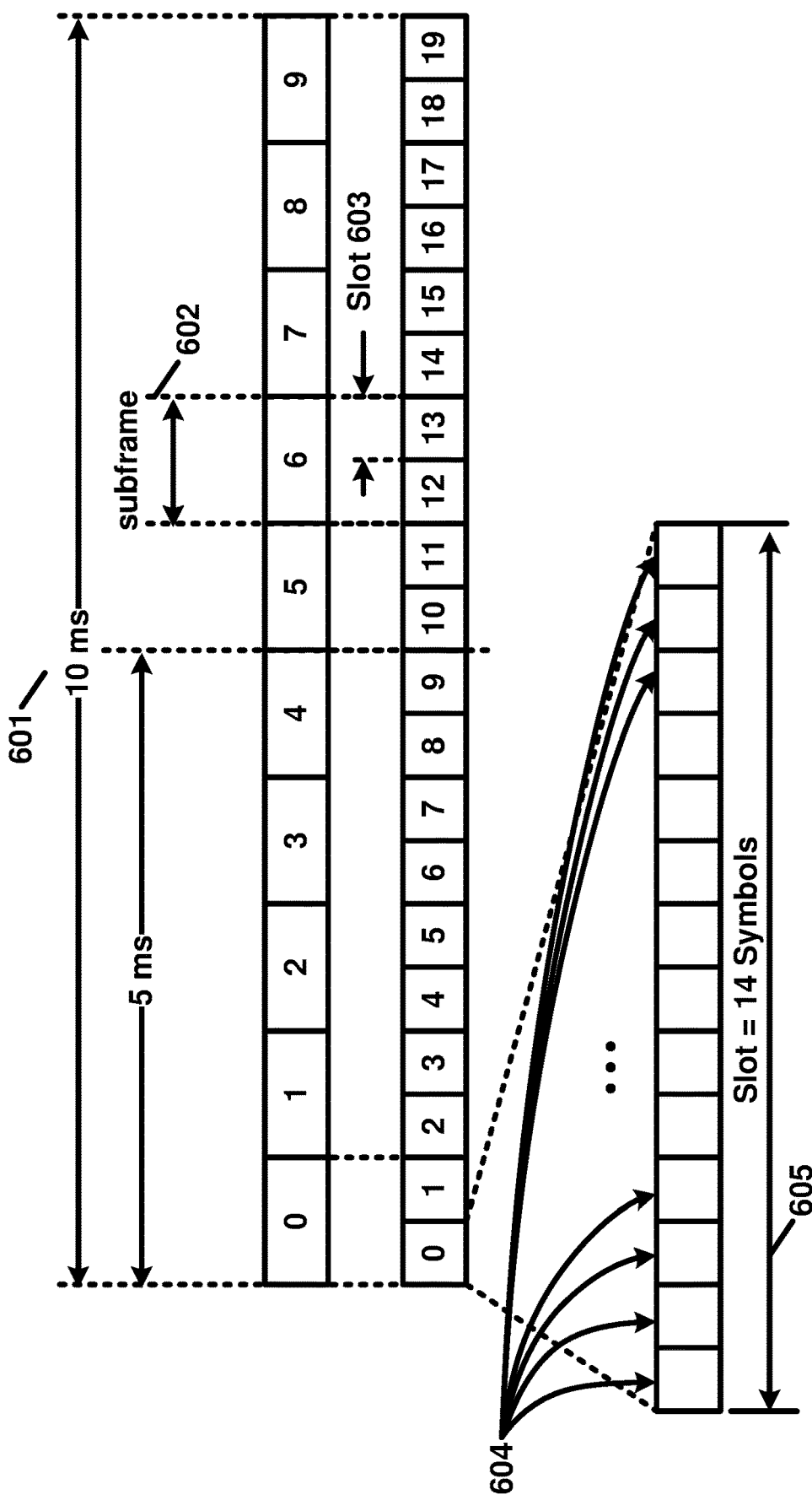
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
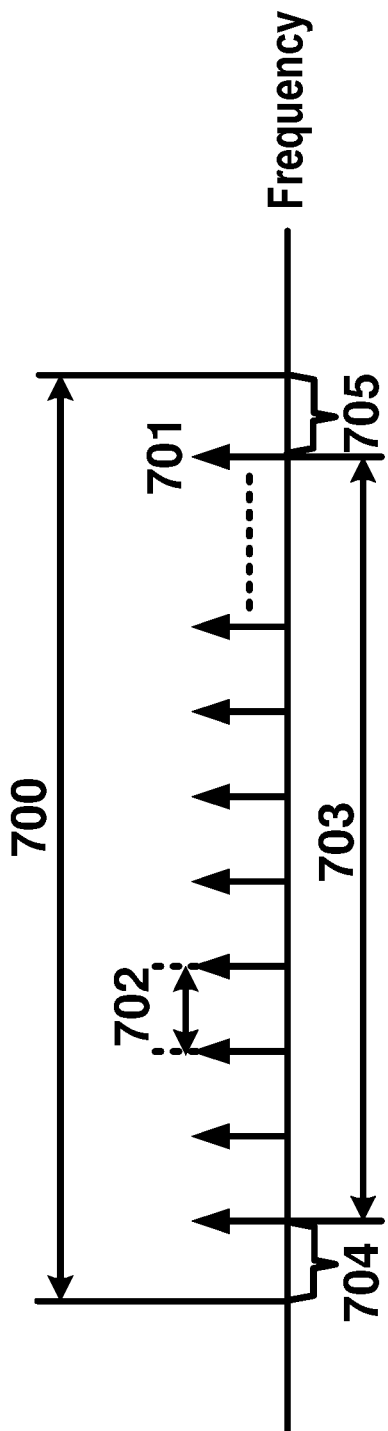
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
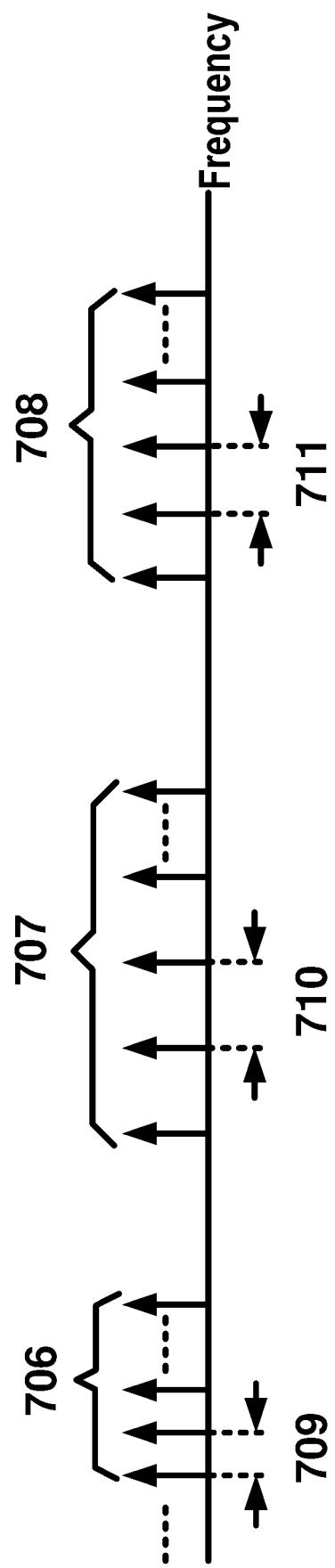

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
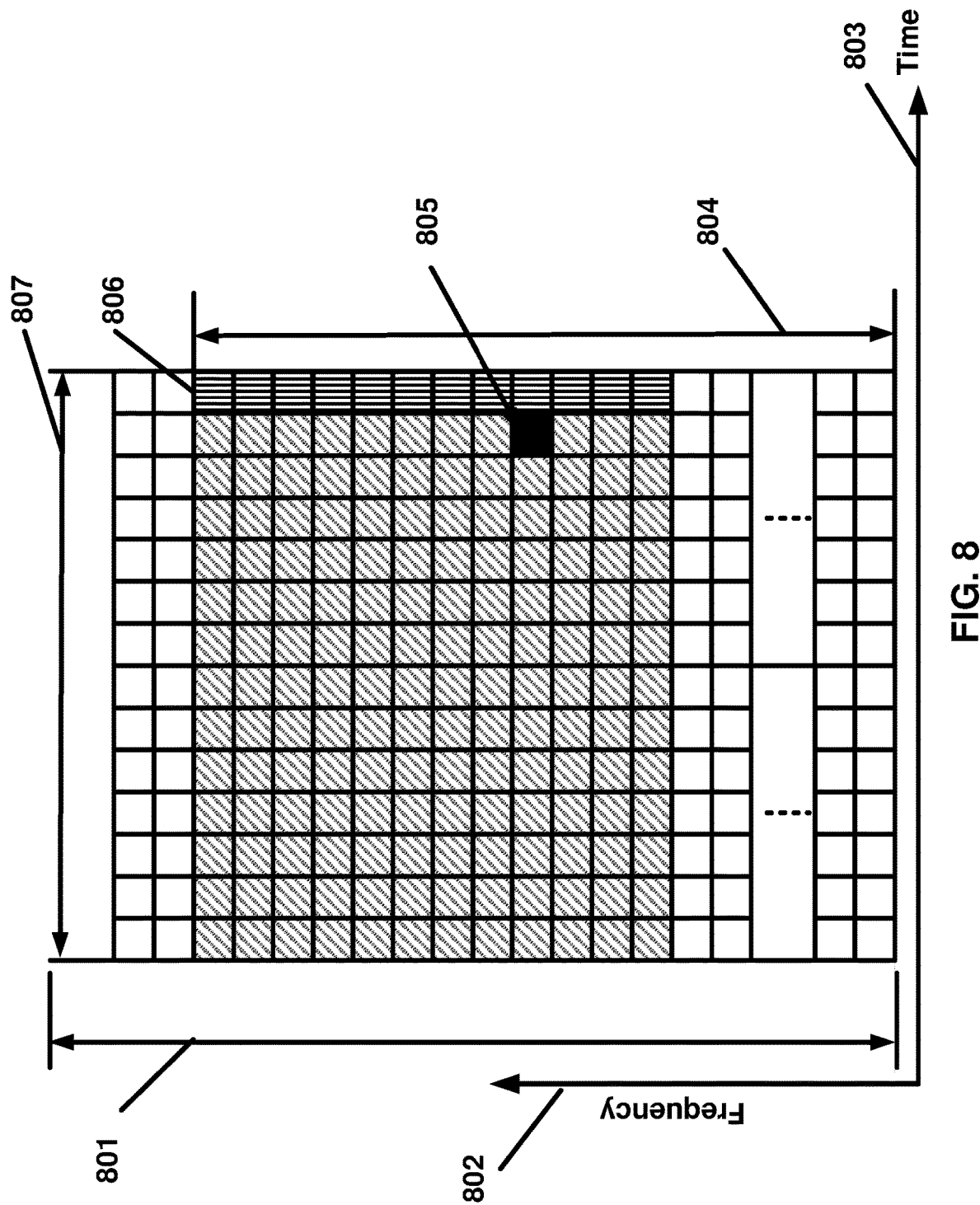
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 9:
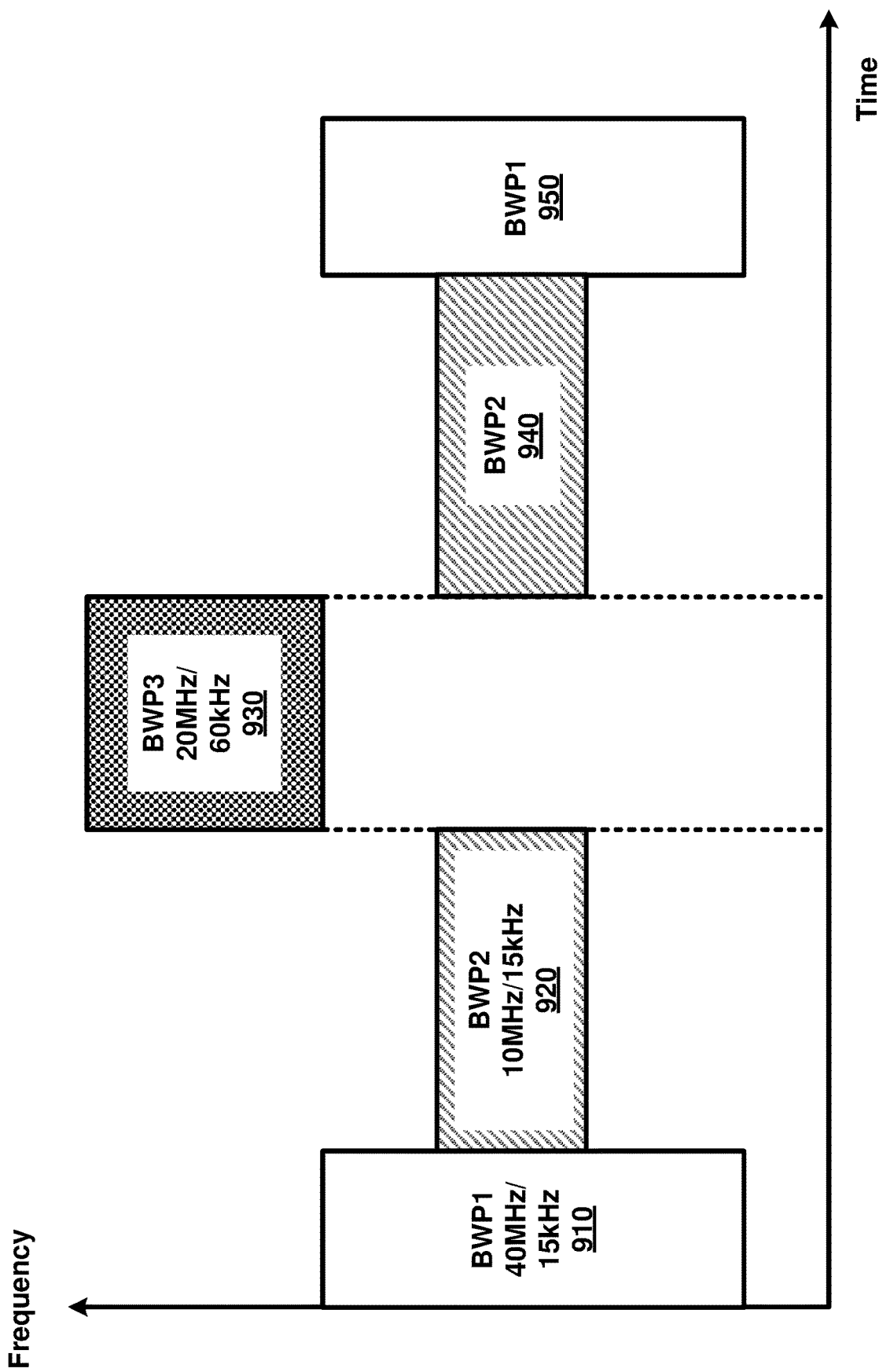
FIG. 9 is an example diagram of configured BWPs as per an aspect of an embodiment of the present disclosure.

FIG. 9 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 9 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 10A:
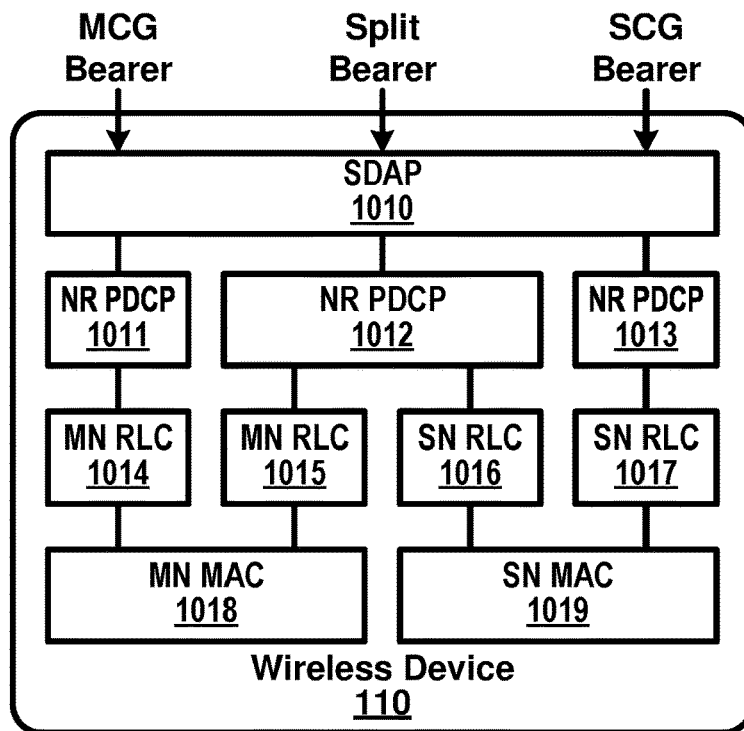
FIG. 10A, and FIG. 10B are diagrams of an example multi connectivity as per an aspect of an embodiment of the present disclosure.
Figure 10B:
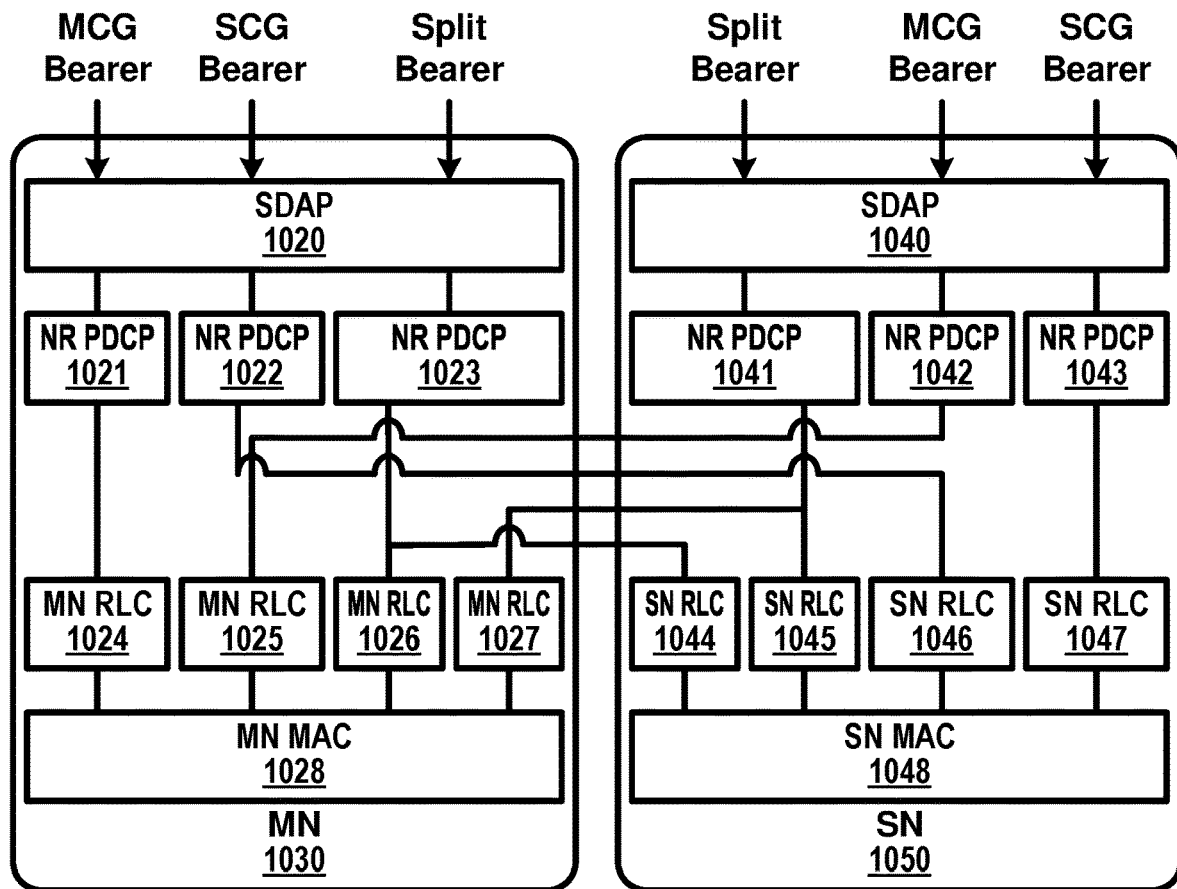

FIG. 10A and FIG. 10B show packet flows employing a multi connectivity (e.g. dual connectivity, multi connectivity, tight interworking, and/or the like). FIG. 10A is an example diagram of a protocol structure of a wireless device 110 (e.g. UE) with CA and/or multi connectivity as per an aspect of an embodiment. FIG. 10B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 11:
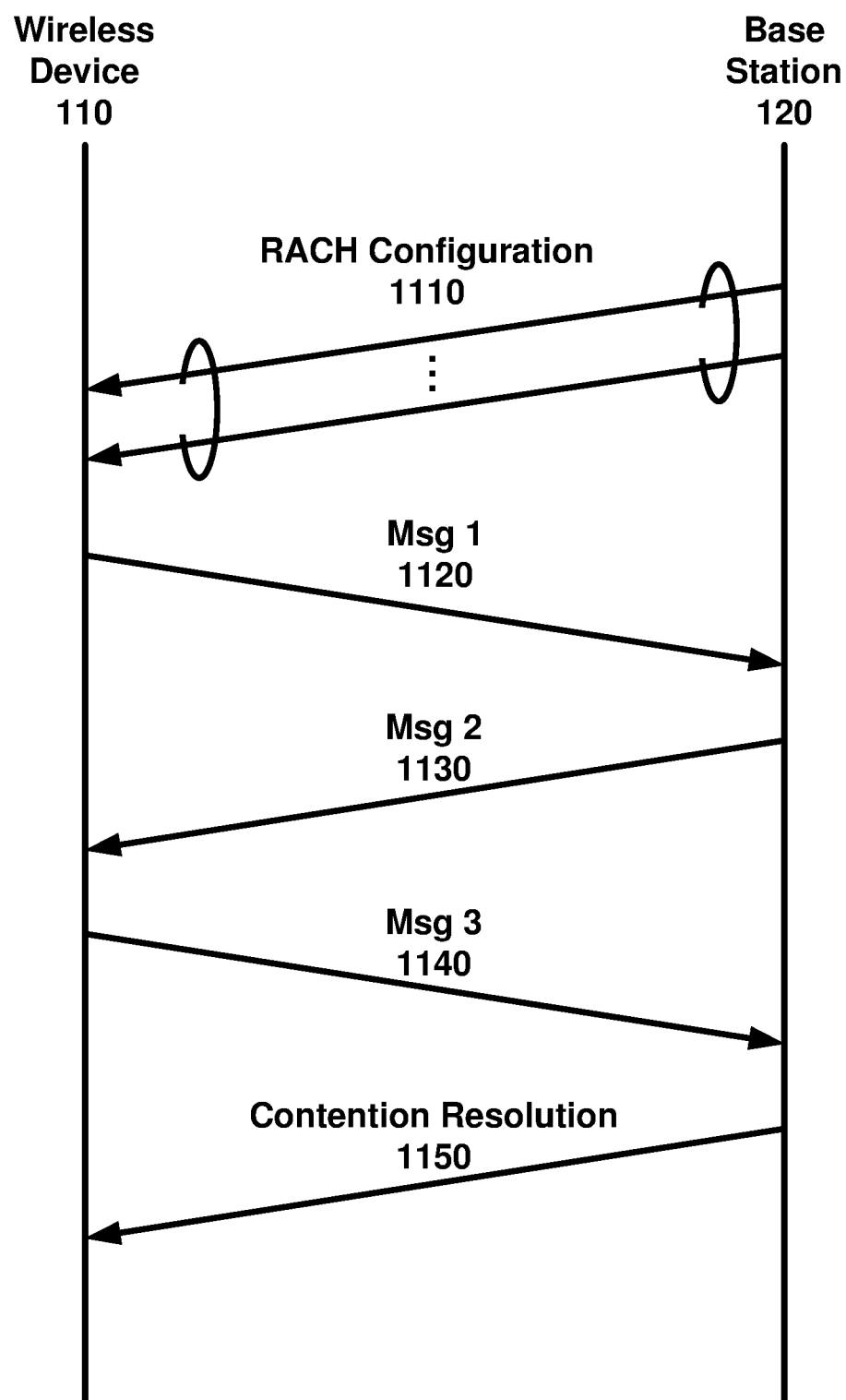
FIG. 11 is a diagram of an example random access procedure as per an aspect of an embodiment of the present disclosure.

FIG. 11 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_I-nactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RS s with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-ResponseWindow or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 12:
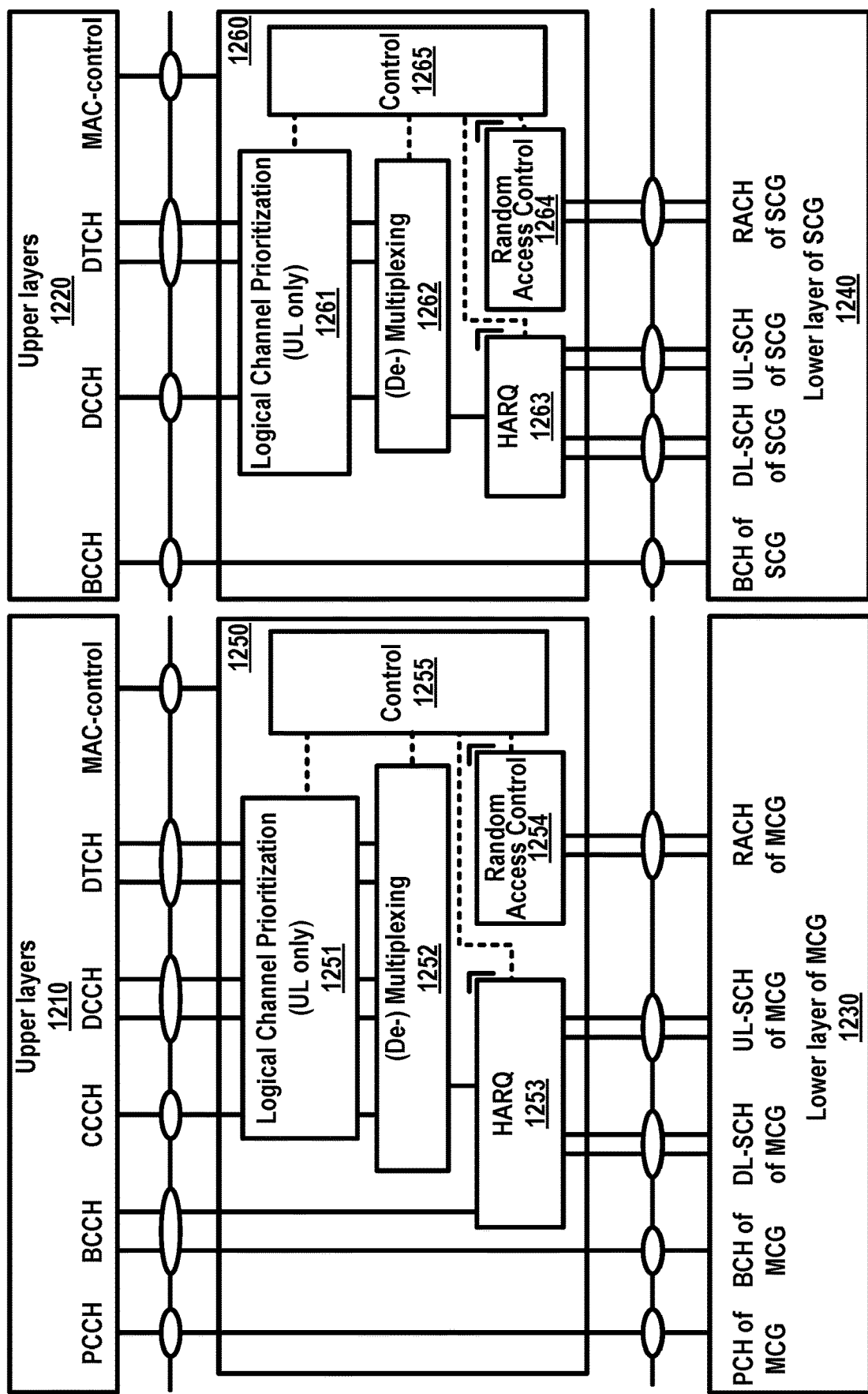
FIG. 12 is a structure of example MAC entities as per an aspect of an embodiment of the present disclosure.
Figure 13:
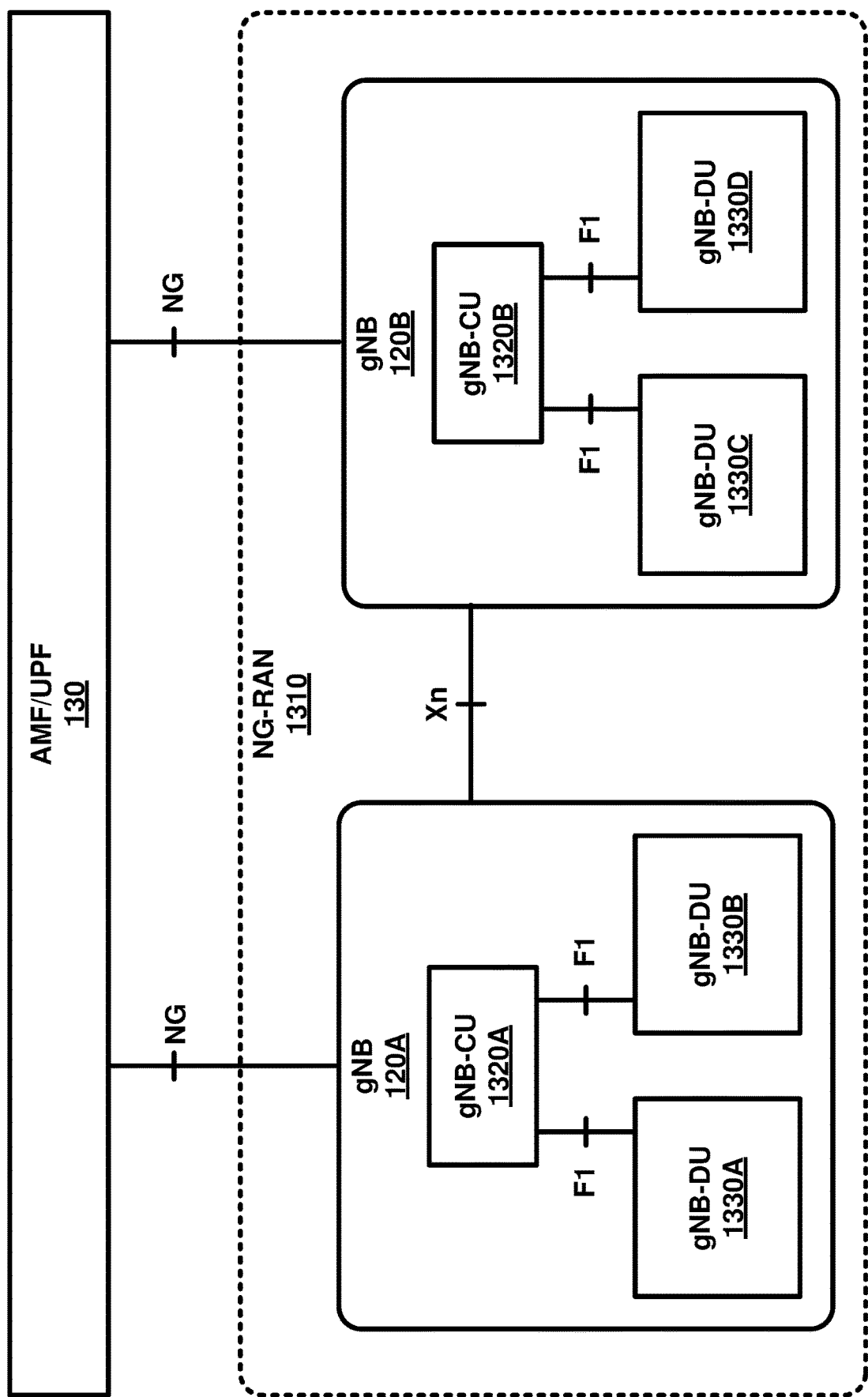
FIG. 13 is a diagram of an example RAN architecture as per an aspect of an embodiment of the present disclosure.

FIG. 12 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

FIG. 13 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 14:
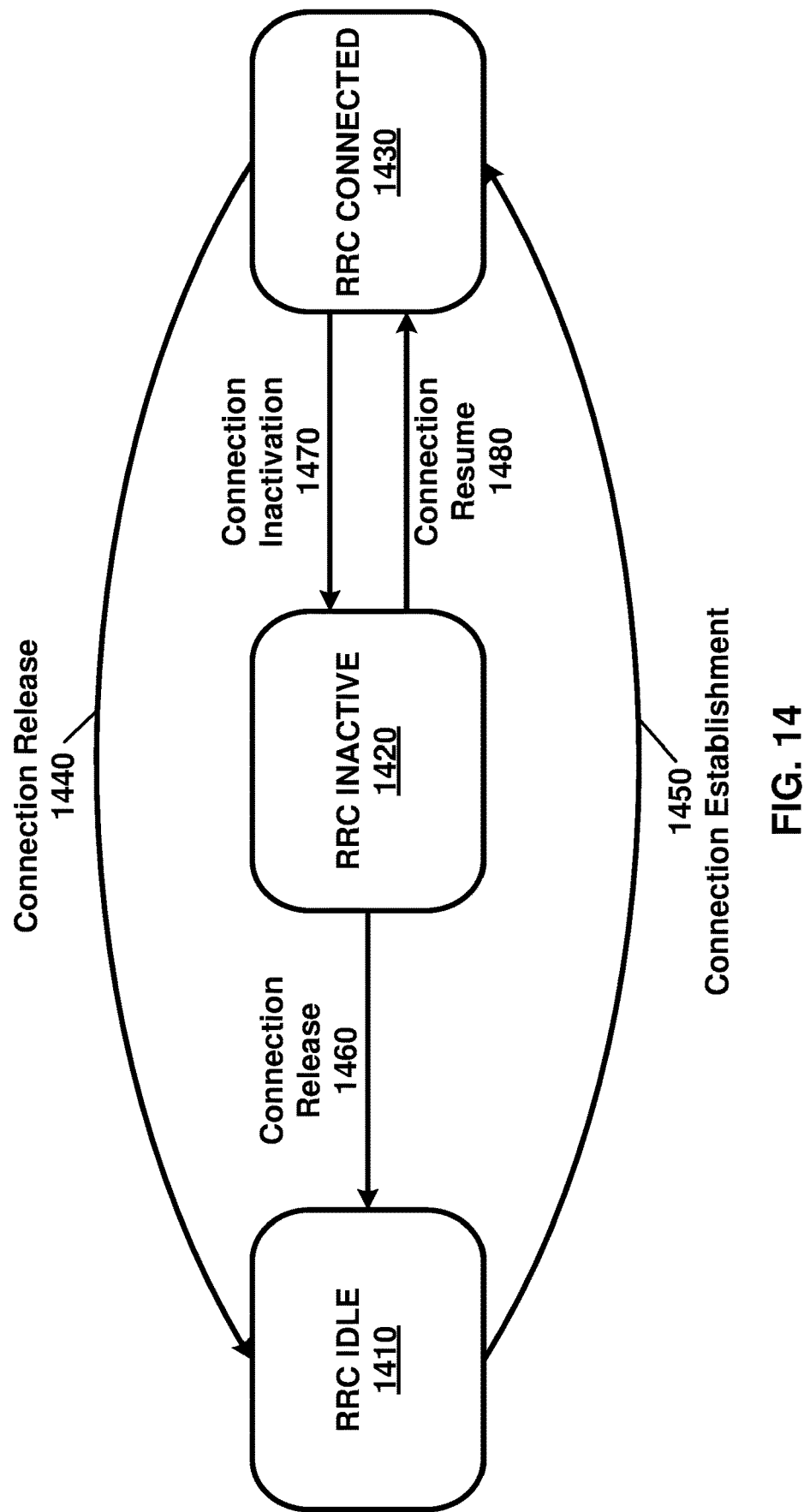
FIG. 14 is a diagram of example RRC states as per an aspect of an embodiment of the present disclosure.

FIG. 14 is an example diagram showing RRC state transitions of a wireless device. In an example, a wireless device may be in at least one RRC state among an RRC connected state (e.g. RRC_Connected 1530, RRC_Connected), an RRC idle state (e.g. RRC Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

Transmission reliability and latency enhancement are example aspects of ultra-reliable low-latency communications (URLLC). In an example, multi-connectivity may enhance reliability for URLLC. In an example, multi-connectivity may comprise packet duplication, link selection, etc. In an example, packet duplication may be used for user-plane and/or control-plane traffic. In an example, LTE-NR dual connectivity may use packet duplication. In an example, the packet data convergence protocol (PDCP) function in a transmitter may enable packet duplication and the PDCP function in the receiver may enable duplicate packet removal. In an example, radio link control (RLC) retransmission (e.g., ARQ) may not be used for URLLC, e.g., for meeting the user-plane latency requirements. In an example, redundancy schemes operating below PDCP and/or in carrier aggregation (CA) scenarios may be used for the reliability/latency enhancement of URLLC.

In an example in NR, multi-connectivity (MC) may comprise dual-connectivity (DC) and/or carrier aggregation (CA). In an example, multi-connectivity may comprise collocated eNBs/gNBs and/or non-collocated eNBs/gNBs. In an example, packet duplication may be based on PDCP with a DC architecture. In an example, packet duplication may be used with centralized and/or non-centralized PDCP. In an example, packet duplication backhaul may be used with different latencies and/or different scheduler implementations (e.g., in LTE-NR integration).

In an example, PDCP duplication may be used in NR. In an example, packet duplication may be in lowers layers, e.g., MAC. In an example, DC may use a plurality of (e.g., two) MAC entities. In an example, the MAC entities and/or the schedulers in MAC entities may be coordinated. In an example, in CA, a common MAC entity, e.g., a scheduler, may control transmissions on a plurality of carriers. In an example, packet duplication may be used with CA. In an example, the MAC layer may have information (e.g., timely information) on radio channel quality measurements (such as channel state information (CSI) report, ACK/NACK feedback, etc.).

In an example, TTI repetitions may be configured e.g., in coverage-limited scenarios. TTI repetitions may increase the reliability. TTI repetitions may increase latency. In an example, the TTI repetitions may be performed on one or more carriers. In an example, with TTI repetitions, the received soft bits of multiple consecutive transmissions within a same HARQ process may be combined. Soft combining gain and/or incremental redundancy gains (e.g., if supported within TTI repetitions) may be achieved.

In an example, duplicate transmission of MAC PDUs (e.g., same transport blocks) may be used. In an example, two or more transport blocks (TBs) of a same size may be created by MAC multiplexing and assembly entity. In an example, two or more TBs may comprise a same duplicated MAC PDU. In an example, HARQ transmissions among carriers may be coupled, e.g., using a same transport block size (TBS). In an example, a receiver may use joint decoding (e.g., soft combining) of the transmissions. In an example, HARQ feedback may be aligned among the carriers. The RLC duplicate discard function may be used to handle the duplicates.

In an example, duplicate transmission of MAC SDUs, e.g., RLC PDUs and/or RLC PDU segments may be used. In an example, MAC multiplexing and assembly entity may transmit MAC SDU duplicates via a plurality of carriers. In an example, the HARQ transmissions among the carriers, e.g. transport block size (and required spectrum), HARQ feedback transmissions, etc. may be independent. In an example, a plurality of carrier bandwidths (e.g., numerologies) and/or carriers with different traffic loads may be considered. In an example, RLC duplicate discard function may be used at the receiver to handle the duplicates.

In an example, NR MAC may support data duplication in carrier aggregation. In an example, the MAC may be configured to duplicate and transmit MAC SDUs among a plurality of carries. In an example, HARQ operation of the transmissions may be independent. In an example, duplicate discard functionality of RLC may be used to discard the duplicates.

In an example, PDCP split bearer and/or PDCP split bearer architecture may be used in CA. In an example, a plurality of RLC entities may be configured corresponding to a PDCP bearer. In an example, PDCP may comprise the duplication function and/or duplicate discard function. In an example, duplicate data may be mapped to two or more logical channels. In an example, MAC multiplexing entity may map data of the RLC entities to different carriers that may be independently transmitted by the HARQ entities associated with the corresponding carriers. In an example, logical channel carrier restrictions may be applied. In an example, one or more flags may be configured for a logical channel to allow/forbid scheduling on one or more carriers. In an example, PDCP split bearer with duplication function may be used in CA architecture. In an example, duplication for CA may build on the PDCP split bearer for duplication to two or more logical channels associated with a MAC entity. In an example, for duplication with CA, transmission restrictions may be configured for one or more carriers per logical channel.

In an example, NR MAC may support data duplication in carrier aggregation by transmitting data from different logical channels using different cells/carriers (e.g. by defining carrier restrictions for a logical channel). Data duplication and duplicate discard may be done in PDCP layer. The PDCP split bearer may be configured with a plurality of logical channels associated to a same cell group/MAC. In an example, data duplicated on PDCP and provided to the different logical channels may be transmitted by MAC via a plurality of carriers.

In an example, using MAC duplication, a same two or more transport blocks (TB) may be transmitted across a plurality of legs, e.g., using one or more MCS and/or redundancy versions. In an example, separate HARQ functions may operate in each leg, e.g., in CA with a HARQ entity comprising a plurality of HARQ processes for a carrier. In an example, a TB may be encoded/decoded and/or go through HARQ process independently. A duplication detection/removal mechanism may be used in MAC layer. In an example, upper layers may handle the duplication detection.

In an example, packet duplication in MAC may be above the HARQ function (e.g., a function per leg) or at the HARQ function level (e.g., single function for sending and combining redundancy versions). In an example, packet duplication in MAC above the HARQ function (e.g., one function per leg) may use a duplication detection/removal function in MAC, or in higher layers.

In an example, packet duplication may be used for user-plane and/or control-plane in NR PDCP. In an example, redundancy schemes operating below PDCP may be used. In an example, a duplication scheme operating at the MAC sublayer may enable a plurality of transmissions of a transport block over a plurality of resource sets to provide diversity gain e.g., against fading, interference and/or link blockage (e.g., shadowing). The different resource sets may be separated in time, frequency and/or space domains. In an example, at the receiver, the transmissions may be soft-combined and/or processed separately.

In an example, PDCP packet duplication may be configured by radio resource configuration (RRC) signaling, e.g., per bearer and/or split radio bearer. In an example, PDCP packet duplication may be configured per UE using higher layer signaling (e.g., RRC). In an example, packet duplication may be enabled/disabled considering e.g., UE mobility, cell resource availability, backhaul loads and latency, etc. In an example, PDCP packet duplication may be activated or deactivated dynamically through downlink control signaling (e.g., physical layer and/or MAC layer signaling). In an example, a UE may initiate duplication e.g., based on triggering one or more criteria (e.g. measurements of L1, L2 signals, or radio resource management (RRM) and/or radio link monitoring (RLM) events, etc.). In an example, a UE may autonomously activate or deactivate PDCP packet duplication based on one or more configured criteria. The one or more criteria may be configured e.g., with RRC. In an example, a UE may receive a configuration of a prohibit timer (e.g., PDCP duplication prohibit timer). In an example, a UE may start the timer when it receives control signaling from gNB/network indicating that PDCP duplication may be deactivated. The UE may autonomously activate duplication when the timer is expired. The timer may be set to infinity to disable UE autonomous activation of PDCP duplication.

In an example, with URLLC packet duplication at PDCP, a UE may report data in its PDCP buffer to a MAC entity in multi-connectivity. In an example, duplicated data may be considered as new data available for transmission. In an example, the duplicated data may be reported and transmitted, e.g., in the same manner as other data. In an example, for MAC buffer status reporting, the UE MAC may include amount of data resulting from the PDCP duplication function as data available for transmission. In an example, data duplicates may use separate uplink grants. In an example, a grant may be unique per cell group. In an example, assignment between a PDCP duplicate PDU and a MAC entity may be done when the duplicate PDUs are generated in PDCP. In an example, a UE may trigger BSR/SR to an applicable MAC entity. In an example, for resource allocation based on dynamic scheduling, a UE may assign a duplicate PDCP PDU to different MAC entities and triggers BSR/SR for an applicable MAC entity when PDCP duplication is active.

In an example, PDCP at a transmitter may support duplicated packet transmission over a plurality of links. In an example, PDCP at a receiver may perform duplication detection/removal. In an example, for a CA scenario, where transmission points on different carrier frequencies may be connected by ideal backhaul, PDCP duplication may be applied, e.g., based on Dual-Connectivity/Multi-Connectivity framework. In an example, PDCP duplication based on Dual-Connectivity/Multi-Connectivity framework may be applied to scenarios where transmission points on different carrier frequencies are connected by ideal backhaul. In an example redundancy operation below PDCP, duplication may be at RLC layer. In an example, RLC entity at a transmitter may make duplicate transmissions of a PDU. In an example, RLC entity at a receiver side may remove received duplications. In an example, redundancy operation at MAC layer may be MAC SDU duplication and/or autonomous HARQ redundant transmission.

In an example, a RLC PDU may correspond to a PDCP PDU. In an example, a duplicated RLC PDU may consist of a duplicated PDCP PDU. In an example, duplicate transmission of RLC PDUs may be equivalent to duplicate transmission of PDCP PDUs. In an example carrier aggregation (CA) scenario (e.g., ideal backhaul), PDCP entity and RLC entity may share a same topology of transmission points and backhaul structure. In an example, MAC SDU duplication may use one HARQ entity per component carrier/cell. In an example, a MAC TB may be transmitted by a HARQ process of a HARQ entity at a carrier. The duplicated MAC SDUs may be in the respective TBs generated for different carriers. The duplication may be at MAC SDU level, which may correspond to a RLC PDU and in turn to a PDCP PDU. In an example, a MAC SDU may not have a sequence number in NR.

In an example, different redundancy versions of a MAC TB may be transmitted over a plurality of aggregated carriers. In an example, a HARQ process may transmit different RVs of a MAC TB over a plurality of component carriers. At the receiver, soft combining may be used. In an example, a MAC TB may consist of a plurality of MAC SDUs/RLC PDUs/PDCP PDUs. In an example, packet duplication may be applied to data radio bearers (DRBs)/logical channels carrying URLLC like services.

In an example, a gNB may configure/enable/disable data redundancy below PDCP layer, considering radio conditions and functionalities provisioned in other layers. In an example, a logical channel may be mapped to one or more numerologies/TTI durations. In an example, if a logical channel may be mapped to one or more numerologies/TTI durations, duplicate data of the logical channel may be transmitted over the one or more numerologies (e.g., in a single carrier and/or multiple carriers).

In an example, support for packet duplication function may be configured per radio bearer. In an example, a UE may enable/disable packet duplication function. In an example, the gNB may indicate the UE to turn on/off the duplication function (e.g., using RRC and/or physical layer and/or MAC layer signaling). In an example, for a radio bearer with packet duplicate function, enabling/disabling packet duplication function may be dynamically controlled.

In an example, for UL packet duplication using Dual connectivity in NR-NR interworking scenario, the UL PDCP entity of the radio bearer may coordinate the transmission of the UL PDCP PDU towards the secondary cell group (SCG) and master cell group (MCG) by indicating the data availability of the same UL PDCP SDU in the buffer status reports (BSRs) to both MCG and SCG. In an example, the wireless device may transmit PDUs of a same PDCP SDU in the logical channels of the MCG and SCG. In an example, the UL PDCP entity may maintain the data availability for the MCG and the SCG separately (e.g. by maintaining separate PDCP SDU buffers for MCG and SCG, or by maintaining separate available or unavailable indications corresponding to SDUs in the same buffer). In an example, whether to allow for duplication and the number of duplications may be configurable via RRC signaling per radio bearer.

In an example, the BSR procedure and SR triggering may be similar as in normal operation without packet duplication. The BSR and SR may be separately triggered by the MAC entities for MCG and SCG on the UE side. In an example, the logical channel(s) corresponding to URLLC may be configured to have highest priority and/or higher priority than other traffic channels. In an example, the logical channel prioritization (LCP) may prioritize the URLLC logical channel(s) when generating and sending the MAC PDU to the lower layers for the UL grant (e.g., configured or dynamic) corresponding to the numerology configured for the URLLC logical channel. In an example, for the DL packet duplication at the PDCP level, the DL RX PDCP entity may discard the duplicated PDCP PDUs e.g., if duplicate reception is detected.

In an example, RRM measurement for mobility in the connected mode may provide information for the gNB/network to manage addition and removal of a cell in multi-connectivity configuration. In an example, semi-static (e.g., using RRC) and dynamic signaling may control which legs of a split bearer, data may be duplicated. In an example, RRM measurements may be considered as baseline input for the data duplication control, e.g., a set of RSRP threshold.

In an example, for DL and UL, duplication for CA may use PDCP duplication to more than one logical channel. In an example, the duplicated PDCP PDUs may be sent over a plurality of (e.g., different) carriers. In an example, the logical channels with data and the logical channels with duplicate data may be handled by one MAC entity. In an example, the logical channels with data and the logical channels with duplicate data may be handled by two or more MAC entities.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/transmission durations/numerologies. In an example, a logical channel may not be mapped to one or more of the plurality of TTIs/transmission durations/numerologies. In an example, a logical channel corresponding to a URLLC bearer may be mapped to one or more first TTIs/transmission durations and a logical corresponding to an eMBB application may be mapped to one or more second TTIs/transmission durations, wherein the one or more first TTIs/transmission durations may have shorter duration than the one or more second TTIs/transmission durations. In an example, the plurality of TTIs/transmission durations/numerologies may be pre-configured at the wireless device. In an example, the one or more messages may comprise the configuration parameters of the plurality of TTIs/transmission durations/numerologies. In an example, a base station may transmit a grant/DCI to a wireless device, wherein the grant/DCI may comprise indication of a cell and/or a TTI/transmission duration/numerology that the wireless device may transmit data. In an example, a first field in the grant/DCI may indicate the cell and a second field in the grant/DCI may indicate the TTI/transmission duration/numerology. In an example, a field in the grant/DCI may indicate both the cell and the TTI/transmission duration/numerology.

In an example, the one or more messages may comprise a logical channel group identifier for one or more of the plurality of the logical channels. In an example, one or more of the plurality of logical channels may be assigned a logical channel group identifier n, 0≤n≤N (e.g., N=3, or 5, or 7, or 11 or 15, etc.). In an example, the one or more of the plurality of logical channels with the logical channel group identifier may be mapped to a same one or more TTIs/transmission durations/numerologies. In an example, the one or more of the plurality of logical channels with the logical channel group identifier may only be mapped to a same one or more TTIs/transmission durations/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/transmission durations/numerologies and/or cells. In an example, the one or more first fields may comprise a first value indicating a logical channel is mapped to one or more first TTI duration/transmission duration shorter than or equal to the first value. In an example, the one or more first fields may comprise a second value indicating a logical channel is mapped to one or more second TTI durations/transmission durations longer than or equal to the second value. In an example, the one or more first fields may comprise and/or indicate one or more TTIs/transmission durations/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/transmission duration/numerology and/or cell. In an example, if a value of 0 in the bitmap associated with a logical channel may indicate that the logical channel is not mapped to a corresponding TTI/transmission duration/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/transmission durations/numerologies and/or cells.

Figure 15:
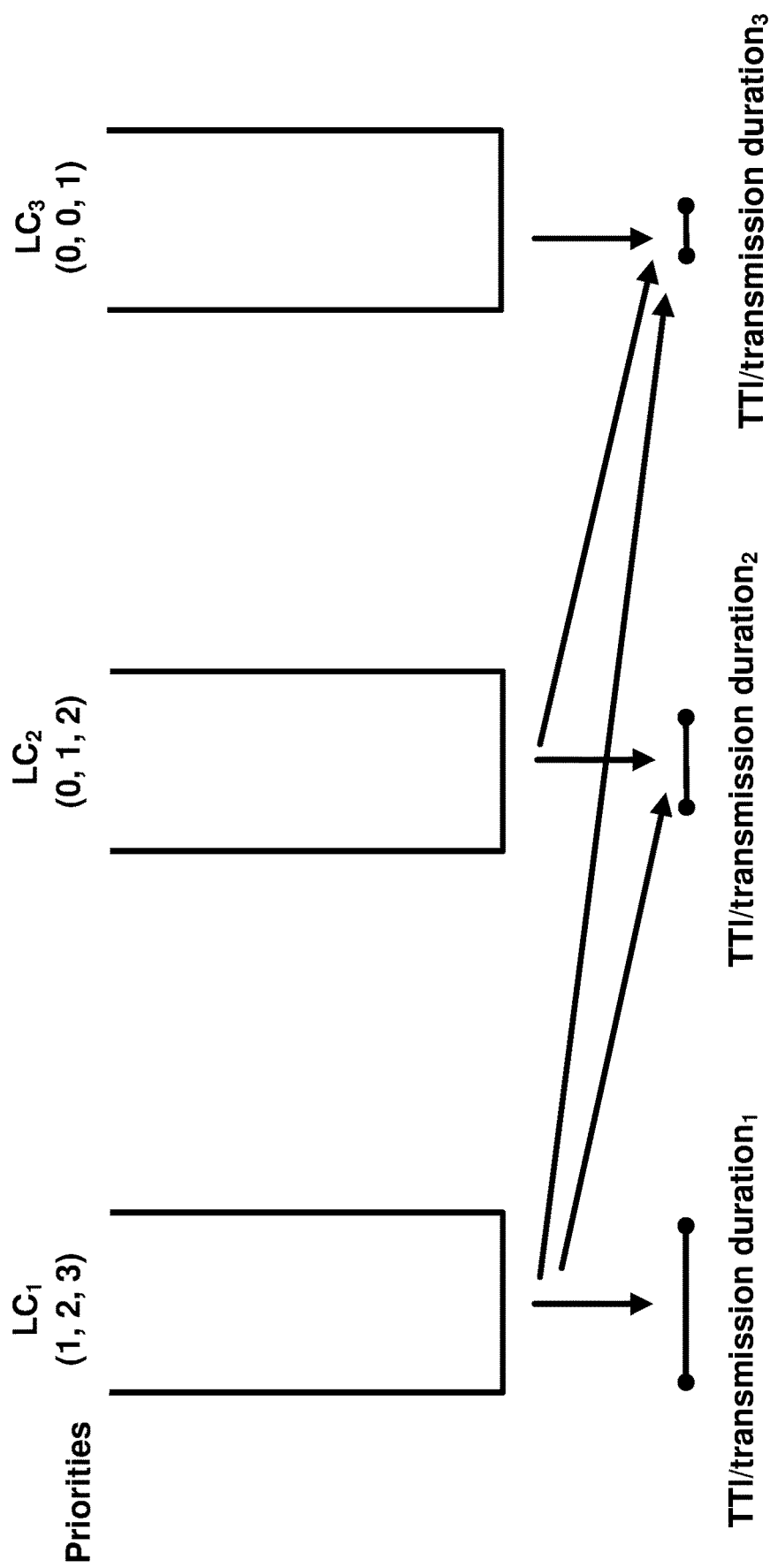
FIG. 15 is a diagram of an example mapping of logical channels to transmission durations as per an aspect of an embodiment of the present disclosure.

In an example, a first logical channel may be assigned at least a first logical channel priority. In an example, the first logical channel may be assigned one or more logical channel priorities for one or more TTIs/transmission durations/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission duration/numerologies. In an example, a priority of a logical channel with a given value (e.g., zero or minus infinity or a negative value) for a TTI/transmission duration/numerology may indicate that the logical channel is not mapped to the TTI/transmission duration/numerology. FIG. 15 illustrates an example with three TTIs/transmission durations/numerologies and three logical channels (LC1, LC2, LC3) wherein LC1 is mapped to TTI/transmission duration1, TTI/transmission duration2, and TTI/transmission duration3 and LC2 is mapped to TTI/transmission duration2 and TTI/transmission duration3 and LC3 is mapped to TTI/transmission duration3. In an example, priorities of LC1 on TTI/transmission duration1, TTI/transmission duration2, and TTI/transmission duration3 may be indicated as (1, 2, 3), priorities of LC2 on TTI/transmission duration1, TTI/transmission duration2, and TTI/transmission duration3 may be indicated as (0, 1, 2), priorities of LC3 on TTI/transmission duration1, TTI/transmission duration2, and TTI/transmission duration3 may be indicated as (0, 0, 1). In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

In an example, a TTI/transmission durations/numerology for a grant (e.g., as indicated by the grant/DCI) may not accept data from one or more logical channels. In an example, the one or more logical channels may not be mapped to the TTI/transmission duration/numerology indicated in the grant. In an example, a logical channel of the one or more logical channels may be configured to be mapped to one or more TTIs/transmission durations/numerologies and the TTI/numerology for the grant may not be among the one or more TTIs/transmission durations/numerologies. In an example, a logical channel of the one or more logical channels may be configured with a max-TTI/transmission duration parameter indicating that the logical channel may not be mapped to a TTI/transmission duration longer than max-TTI/transmission duration, and the grant may be for a TTI/transmission duration longer than max-TTI/transmission duration. In an example, a logical channel may be configured with a min-TTI/transmission duration parameter indicating that the logical channel may not be mapped to a TTI/transmission duration shorter than min-TTI/transmission duration, and the grant may be for a TTI/transmission duration shorter than min-TTI/transmission duration. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs/transmission durations, the numerology/TTI/transmission duration indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI/transmission duration indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

Example embodiments enhance triggering conditions for a wireless device to enable/disable packet duplication function.

Example A

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the PDCP layer (e.g., frequent undelivered PDCP PDUs). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage of PDCP PDUs that were not successfully transmitted/delivered. In an example, the percentage may be measured for a time window. In an example, the time window may be pre-configured. In example, the value of time window may be indicated by higher layers (e.g., RRC). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and a duplicate PDCP PDU may correspond to different RLC entities/logical channels. In an example, the wireless device may receive one or more DCIs/grants for transmission on one or more cells e.g., for one or more numerologies/TTIs on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the RLC layer (e.g., frequent undelivered RLC PDUs corresponding to the bearer/PDCP entity configured with packet duplication). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage of RLC PDUs, corresponding to a bearer configured with duplication, that were not successfully transmitted/delivered. In an example, the percentage may be measured for a time window. In an example, the time window may be pre-configured. In example, the value of time window may be indicated by higher layers (e.g., RRC). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDU may correspond to different RLC entities/logical channels. In an example, the wireless device may receive one or more DCIs/grants for transmission on one or more cells e.g., for one or more numerologies/TTIs on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resourced indicates in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the PHY/MAC layer (e.g., frequent HARQ NACKs and/or poor channels conditions on one or more cells/numerologies mapped to a logical channel corresponding to a bearer configured with packet duplication). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage/number of HARQ NACKs received for packets transmitted on one or more cells/numerologies where a logical channel corresponding to a bearer configured with duplication, is mapped to. In an example, the percentage may be measured for a time window. In an example, the time window may be pre-configured. In an example, the value of time window may be indicated by higher layers (e.g., RRC). In an example, the threshold may indicate a threshold channel quality indicator (CQI). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDU may correspond to different RLC entities/logical channels. In an example, the wireless device may receive one or more DCIs/grants for transmission on one or more cells e.g., for one or more numerologies/TTIs on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Example embodiment enhance efficiency of logical channel multiplexing by discarding data that has already been transmitted from logical channels corresponding to a bearer that is configured with packet duplication.

Example B

The NR radio access technology employs packet duplication at the PDCP layer to enhance reliability for some service types (e.g., URLLC). The packets associated with a radio bearer are duplicated at PDCP layer. The packets of radio bearer and its duplicates are stored at buffers associated with two logical channels corresponding to the radio bearer. Data from the two logical channels associated with the radio bearers are transmitted via different cells and depending on the grants received on the different cells, rate of depletion of data from the two logical channels may be different. Existing procedures for multiplexing data in uplink grants may lead to transmitting data that has been already transmitted and acknowledged for multiple times and leads to inefficient radio link and degraded network throughput. The embodiments enhance legacy data multiplexing procedures when a radio bearer is configured with packet duplication for a wireless device and the packet duplication is activated for the wireless device.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDUs may correspond to different RLC entities/logical channels. In an example, if a first logical channel with PDCP PDUs (or duplicate PDCP PDUs) of a bearer configured with packet duplication contains a first amount of data (e.g., X bytes or X PDCP PDUs/RLC SDUs) and a second logical channel with duplicate PDCP PDUs (or PDCP PDUs) of a bearer configured with packet duplication contains a second amount of data (e.g., Y bytes or Y PDCP PDUs/RLC SDUs), and the first amount of data is larger than the second amount of data, the wireless device MAC entity may discard a portion of data in the first logical channel that has been transmitted and acknowledged (e.g., HARQ ACKed and/or RLC ACKed). In an example, if the first amount of data is X bytes and the second amount of data is Y bytes and X is larger than Y, the wireless device may discard as much as (X-Y-unACKed data) on top of the buffer for the first logical channel. In an example with more than one logical channel containing duplicate PDCP PDUs, the wireless device MAC entity may discard a portion of data that has been transmitted and acknowledged (e.g., HARQ ACKed and/or RLC ACKed) in at least one logical channel from a plurality of logical channels corresponding to the same bearer. In an example, if the buffer for a logical channel that contains PDCP PDUs or duplicate PDCP PDUs for a bearer configured with packet duplication is emptied and the last data in the buffer is acknowledged (e.g., HARQ ACKed and/or RLC ACKed) after transmission, the wireless device MAC entity may empty one or more logical channels corresponding to the radio bearer (e.g., logical channels containing PDCP PDUs or duplicate PDCP PDUs from the bearer). In an example, the wireless device may perform the data discarding process described in configured times.

In an example, the wireless device may perform duplicate data discard when a buffer status report is triggered and/or when the wireless device creates the buffer status report MAC CE. In an example, the wireless device may receive one or more DCIs/grants for transmission on one or more cells e.g., for one or more numerologies/TTIs on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Figure 16:
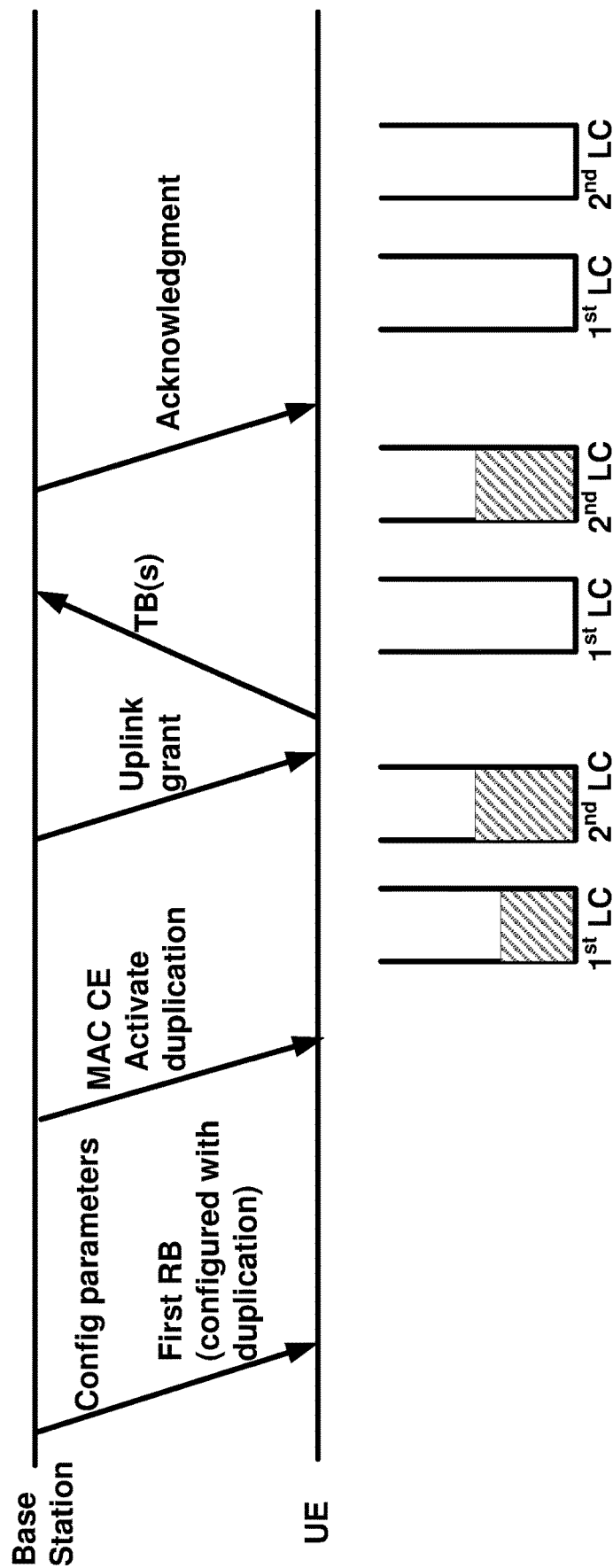
FIG. 16 is a diagram of an example packet duplication procedure as per an aspect of an embodiment of the present disclosure.

In an example embodiment, as shown in FIG. 16, a wireless device may receive one or more messages comprising configuration parameters. The one or more messages may comprise configuration parameters for one or more bearers comprising a first radio bearer. In an example, the first radio bearer is a data radio bearer. In an example, the first radio bearer may correspond to an ultra-reliable low-latency communications (URLLC) service type. In an example, the first radio bearer is a signaling radio bearer. The configuration parameters may comprise a first information element indicating that packet duplication is configured for the first radio bearer. The wireless device may receive a MAC control element indicating activation of packet duplication for the first radio bearer. In an example, the first radio bearer may correspond to a first logical channel and a second logical channel. In an example, packets (e.g., PDCP packets) associated with the first radio bearer are duplicated in the first logical channel and the second logical channel. In an example, a first packet corresponding to the first logical channel may correspond to a first radio link control entity. In an example, a second packet corresponding to the second logical channel may correspond to a second radio link control entity. In an example, the one or more messages may comprise logical channel configuration parameters indicating that one or more first cells are first allowed serving cells for the first logical channel; and one or more second cells are second allowed serving cells for the second logical channel. The one or more second cells may be different from the one or more first cells.

The wireless device may receive an uplink grant for transmission of one or more transport blocks. The uplink grant may comprise transmission parameters for the one or more first transport blocks. The transmission parameters may comprise radio resource allocation parameters, power control related parameters, HARQ related parameters, etc. The wireless device may transmit the one or more first transport blocks. The one or more first transport blocks may comprise data of one or more first buffers associated with the first logical channel. The uplink grant may be for a first cell in the one or more first cells associated with the first logical channel. The wireless device may receive an acknowledgement for the one or more first transport blocks in response to transmitting the one or more first transport blocks. In an example, the acknowledgement may be a HARQ/MAC layer acknowledgement. In an example, the acknowledgement may be a radio link control layer acknowledgement. In an example, the acknowledgment may be a PDCP layer acknowledgment. The wireless device and/or base station may perform a duplicate discard function at the PDCP layer.

As shown in FIG. 16, in response to transmission of the one or more first transport blocks, one or more buffers associated with the first logical channel may be emptied. The wireless device may flush one or more second buffers associated with the second logical channel in response to the one or more first buffers being emptied in response to the transmission of the one or more first TBs. The flushing the one or more second buffers associated with the second logical channel may comprise ignoring/discarding data in the one or more second buffers associated with the second logical channel. In an example, the wireless device may receive a second uplink grant for transmission of one or more second transport blocks. The second uplink grant may comprise second transmission parameters for transmission of the one or more second transport blocks. The wireless device may transmit the one or more second transport blocks employing the second transmission parameters.

Example embodiments enhance buffer status reporting when one or more bearers are configured with packet duplication.

Example C

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDUs may correspond to different RLC entities/logical channels. In an example, a wireless device MAC entity may perform data discard process (e.g., as described in Example B embodiments). In an example, a wireless device MAC entity may perform data discard process (e.g., as described in Example B embodiments) when a buffer status report is triggered and/or when a buffer status report MAC CE is created. One or more logical channels corresponding to a bearer configured with packet duplication for which packet duplication is enabled (e.g., enabled by the base station) may have substantially same amount of data (e.g., when the buffer status report MAC CE is created). In an example, a logical channel of the one or more logical channels may have as much as unacknowledged data less data in the logical channel's buffer compared to other logical channels in the one or more logical channels. In an example, if the base station configures/enables the packet duplication for a bearer configured for the wireless device, a plurality of logical channels may correspond to bearer. In an example, the buffer status report may comprise buffer status of one logical channels corresponding to the bearer (e.g., logical channels comprising PDCP PDUs). In an example, the wireless device may receive one or more DCIs/grants for transmission on one or more cells e.g., for one or more numerologies/TTIs on the one or more cell. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in Example B embodiments). In an example, a wireless device MAC entity may perform data discard process (e.g., as described in Example B embodiments) when a buffer status report is triggered and/or when a buffer status report MAC CE is created. One or more logical channels corresponding to a bearer configured with packet duplication for which packet duplication is enabled (e.g., enabled autonomously by the wireless device) may have substantially same amount of data (e.g., when the buffer status report MAC CE is created). In an example, a logical channel of the one or more logical channels may have as much as unacknowledged data less data in the logical channel's buffer compared to other logical channels in the one or more logical channels. In an example, if the wireless device autonomously enables the packet duplication for a bearer configured for the wireless device (and/or configured with packet duplication), a plurality of logical channels may correspond to bearer. In an example, the buffer status report may comprise buffer status of one logical channels corresponding to the bearer (e.g., logical channels comprising PDCP PDUs). In an example, the buffer status report may comprise an indication that a logical channel has a corresponding logical channel with duplicate data. In an example, the indication may be in form of a bit map. In an example, the indication may be in the MAC subheader corresponding to the BSR. In an example, a value of one in the bit map corresponding to a logical channel may indicate that there is one or more logical channels corresponding to the logical channel with duplicate data. In an example, the wireless device may receive one or more DCIs/grants for transmission on one or more cells e.g., for one or more numerologies/TTIs on the one or more cell. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Example embodiment enhance the HARQ retransmission procedure when one or more bearers are configured with packet duplication.

Example D

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more cells. In an example, the base station may configure a logical channel not be transmitted on an LAA cell. In an example, the base station may configure a logical channel with a bitmap indicating the one or more cells that a logical channel may and/or may not be mapped to (e.g., data from the logical channel may and/or may not be transmitted on). In an example, the wireless device may receive a DCI/grant for transmission on a first cell e.g., for a first numerology/TTI. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more cells and create a first MAC PDU. In an example, the one or more cells may not comprise the first cell. The physical layer may create a first TB using the first MAC PDU. The wireless device may calculate power for the first TB using at least the power control commands in the DCI/grant and may map the TB to the resources indicated in the DCI/grant and may transmit the TB. In an example, a HARQ entity may handle transmission and/or retransmission of transport blocks on a plurality of cells comprising the first cell. In an example, the wireless device may receive a NACK and/or a second DCI/grant indicating retransmission of the first TB (or a new redundancy version of the first TB). In an example, the DCI/grant may indicate the HARQ retransmission of the first TB on a second cell of the plurality of cells. In an example, the second cell may not be among the one or more cells. The wireless device may transmit the HARQ retransmission of the first TB e.g., using the transmission parameters (e.g., resources) indicated in the second DCI/grant. In an example, the HARQ entity may be indicated that there is a restriction for a TB (e.g., corresponding to a HARQ process) not to be transmitted on the one one or more cells.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more cells. In an example, the base station may configure a logical channel not be transmitted on an LAA cell. In an example, the base station may configure a logical channel with a bitmap indicating the one or more cells that a logical channel may and/or may not be mapped to (e.g., data from the logical channel may and/or may not be transmitted on). In an example, the wireless device may receive a DCI/grant for transmission on a first cell e.g., for a first numerology/ TTI. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more cells and create a first MAC PDU. In an example, the one or more cells may not comprise the first cell. The physical layer may create a first TB using the first MAC PDU. The wireless device may calculate power for the first TB using at least the power control commands in the DCI/grant and may map the TB to the resources indicated in the DCI/grant and may transmit the TB. In an example, a HARQ entity may handle transmission and/or retransmission of transport blocks on a plurality of cells comprising the first cell. In an example, the wireless device may receive a NACK and/or a second DCI/grant indicating retransmission of the first TB (or a new redundancy version of the first TB). In an example, the DCI/grant may indicate the HARQ retransmission of the first TB on a second cell of the plurality of cells. In an example, the second cell may be among the one or more cells. The wireless device may transmit the HARQ retransmission of the first TB e.g., using the transmission parameters (e.g., resources) indicated in the second DCI/grant.

Example E

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more numerologies/TTIs. In an example, the base station may configure a logical channel with a bitmap indicating the one or more numerologies/TTIs that a logical channel may and/or may not be mapped to (e.g., data from the logical channel may and/or may not be transmitted on). In an example, the wireless device may receive a DCI/grant for transmission on a first cell e.g., for a first numerology/TTI. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more numerologies/TTIs and create a first MAC PDU. In an example, the one or more numerologies/TTIs may not comprise the first numerology/TTI. The physical layer may create a first TB using the first MAC PDU. The wireless device may calculate power for the first TB using at least the power control commands in the DCI/grant and may map the TB to the resources indicated in the DCI/grant and may transmit the TB. In an example, HARQ entity may handle transmission and/or retransmission of transport blocks on a plurality of TTIs/numerologies of the first cell comprising the first TTI/numerology. In an example, the wireless device may receive a NACK and/or a second DCI/grant indicating retransmission of the first TB (or a new redundancy version of the first TB). In an example, the DCI/grant may indicate the HARQ retransmission of the first TB on a second TTI/numerology of the plurality of TTIs/numerologies. In an example, the second TTI/numerology may not be among the one or more TTIs/numerologies. The wireless device may transmit the HARQ retransmission of the first TB e.g., using the transmission parameters (e.g., resources) indicated in the second DCI/grant. In an example, the HARQ entity may be indicated that there is a restriction for a TB (e.g., corresponding to a HARQ process) not to be transmitted on the one one or more TTIs/numerologies.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more numerologies/TTIs. In an example, the base station may configure a logical channel with a bitmap indicating the one or more numerologies/TTIs that a logical channel may and/or may not be mapped to (e.g., data from the logical channel may and/or may not be transmitted on). In an example, the wireless device may receive a DCI/grant for transmission on a first cell e.g., for a first numerology/TTI. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more numerologies/TTIs and create a first MAC PDU. In an example, the one or more numerologies/TTIs may not comprise the first numerology/TTI. The physical layer may create a first TB using the first MAC PDU. The wireless device may calculate power for the first TB using at least the power control commands in the DCI/grant and may map the TB to the resources indicated in the DCI/grant and may transmit the TB. In an example, HARQ entity may handle transmission and/or retransmission of transport blocks on a plurality of TTIs/numerologies of the first cell comprising the first TTI/numerology. In an example, the wireless device may receive a NACK and/or a second DCI/grant indicating retransmission of the first TB (or a new redundancy version of the first TB). In an example, the DCI/grant may indicate the HARQ retransmission of the first TB on a second TTI/numerology of the plurality of TTIs/numerologies. In an example, the second TTI/numerology may be among the one or more TTIs/numerologies. The wireless device may transmit the HARQ retransmission of the first TB e.g., using the transmission parameters (e.g., resources) indicated in the second DCI/grant.

Example F

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in Example B embodiments). The buffers for logical channels corresponding to data and duplicate data may have same data. In an example, the wireless device may receive a plurality of DCIs/grants. A grant/DCI in the plurality of DCIs/grants may comprise transmission parameters (e.g., time/frequency resources, HARQ parameters, MCS, power control commands, etc.). In an example, the wireless device may create a plurality of TBs using to the plurality of DCIs/grants. In an example, each of the plurality of TBs may contain data from a logical channel of the plurality of logical channels corresponding to a same bearer (e.g., bearer configured with packet duplication). In an example, a first TB of the plurality of TBs may comprise only data from a logical channel corresponding to the bearer. The wireless device may receive an ACK for other TBs in the plurality of TBs. The wireless device may stop transmission or retransmission of the first TB. The wireless device may flush the HARQ buffer corresponding to the first TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in Example B embodiments). The buffers for logical channels corresponding to data and duplicate data may have same data. In an example, the wireless device may receive a plurality of DCIs/grants for a same TTI on a plurality of cells. A grant/DCI in the plurality of DCIs/grants may comprise transmission parameters (e.g., time/frequency resources, HARQ parameters, MCS, power control commands, etc.). In an example, the wireless device may create a plurality of TBs using to the plurality of DCIs/grants. In an example, each of the plurality of TBs may contain data from a logical channel of the plurality of logical channels corresponding to a same bearer (e.g., bearer configured with packet duplication). In an example, a first TB of the plurality of TBs may comprise only data from a logical channel corresponding to the bearer. The wireless device calculate power for the plurality of TBs at least using the power control commands indicated in the plurality of DCIs/grants. In an example, the wireless device may drop the first TB if the wireless is power limited e.g., if the total calculated power is larger than the UE maximum transmit power.

Example embodiments enhance the efficiency of BSR and PHR reporting when a plurality of MAC entities handle transmission of data from logical channels that contain data and duplicate data.

Example G

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a plurality of BSRs corresponding to the plurality of MAC entities to the base station, each BSR comprising buffer status for logical channels corresponding to logical channels handled by a MAC entity.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a BSR to the base station, the BSR comprising buffer status for logical channels handled by the plurality of MAC entity. The BSR may be used by the plurality of MAC entities for scheduling the wireless device.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a power headroom report (PHR) corresponding to a grant/DCI received from a MAC entity to the base station.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signalling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signalling (e.g., PDCCH like signalling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a power headroom report (PHR) corresponding to a grant/DCI received from any MAC entity to the base station.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 17:
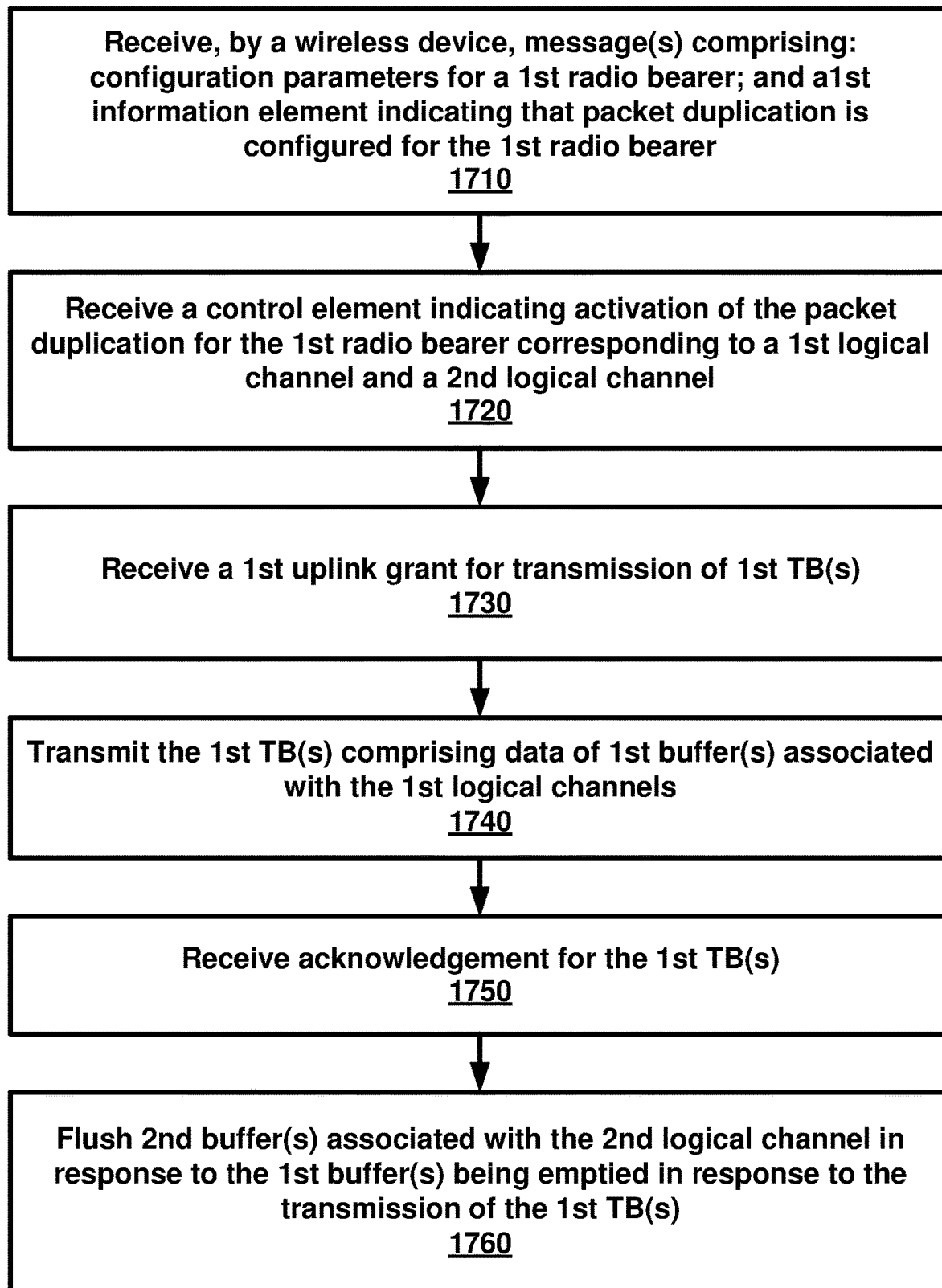
FIG. 17 is an example flow diagram as per an aspect of an embodiment of the present disclosure.

FIG. 17 is an example flow diagram as per an aspect of an embodiment of the present disclosure. At 1710, a wireless device may receive one or more messages comprising configuration parameters for a first radio bearer; and a first information element indicating that packet duplication is configured for the first radio bearer. At 1720, a control element indicating activation of the packet duplication for the first radio bearer corresponding to a first logical channel and a second logical channel may be received. At 1730, a first uplink grant for transmission of one or more first transport blocks (TBs) may be received. At 1740, the one or more first TBs may be transmitted. The one or more first TBs may comprise data of one or more first buffers associated with the first logical channels. At 1750, acknowledgement for the one or more first TBs may be received. At 1760, one or more second buffers associated with the second logical channel may be flushed in response to the one or more first buffers being emptied in response to the transmission of the one or more first TBs.

According to an embodiment, packets associated with the first radio bearer may be duplicated in the first logical channel and the second logical channel. According to an embodiment, the first radio bearer may be one of a data radio bearer or a signaling radio bearer. According to an embodiment, the one or more messages may comprise logical channel configuration parameters indicating that: one or more first cells are first allowed serving cells for the first logical channel; and one or more second cells are second allowed serving cells for the second logical channel. The one or more second cells may be different from the one or more first cells. According to an embodiment, the one or more first cells may comprise a first cell; and the first uplink grant is for the first cell. According to an embodiment, the logical channel configuration parameters may further indicate that: the first logical channel is mapped to one or more first transmission durations; and the second logical channel is mapped to one or more second transmission durations. According to an embodiment, the acknowledgement may be at least one of the medium access control layer acknowledgement or radio link control layer acknowledgement or packet data convergence protocol layer acknowledgement. According to an embodiment, a duplicate discard function may be performed at a packet data convergence protocol layer. According to an embodiment, a first packet may correspond to the first logical channel corresponds to a first radio link control entity; and a second packet may correspond to the second logical channel corresponds to a second radio link control entity. According to an embodiment, the first radio bearer may correspond to an ultra-reliable low-latency communications service type.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, an indication for activation of packet data convergence protocol (PDCP) packet duplication of a radio bearer associated with a first radio link control (RLC) entity and a second RLC entity;
   duplicating a packet of the radio bearer;
   providing the packet to the first RLC entity;
   providing a duplicate packet to the second RLC entity;
   receiving an uplink grant for the packet of the first RLC entity;
   transmitting the packet of the first RLC entity based on the uplink grant for the packet of the first RLC entity;
   receiving an acknowledgement of a successful delivery for the packet of the first RLC entity before receiving an uplink grant for the duplicate packet of the second RLC entity; and
   in response to the acknowledgement, discarding the duplicate packet of the second RLC entity.

2. The method of claim 1,
   wherein the providing of the packet to the first RLC entity comprises providing the packet to a first logical channel associated with the first RLC entity, and
   wherein the providing of the duplicate packet to the second RLC entity comprises providing the duplicate packet to a second logical channel associated with the second RLC entity.

3. The method of claim 1, wherein the packet is a PDCP data protocol data unit.

4. The method of claim 1, further comprising:
   receiving, by the wireless device, one or more radio resource control (RRC) messages comprising:
   configuration parameters for the radio bearer, and
   a first information element indicating that the PDCP packet duplication is configured for transmission of packets of the radio bearer.

5. The method of claim 4, wherein the one or more RRC messages comprise logical channel configuration parameters indicating that:
   one or more first cells are first allowed serving cells for a first logical channel associated with the first RLC entity, and
   one or more second cells are second allowed serving cells for a second logical channel associated with the second RLC entity.

6. The method of claim 5, wherein the logical channel configuration parameters further indicate that:
   the first logical channel is mapped to one or more first transmission durations, and
   the second logical channel is mapped to one or more second transmission durations.

7. The method of claim 1, wherein the acknowledgement is at least one of a medium access control layer acknowledgement or an RLC layer acknowledgement or a PDCP layer acknowledgement.

8. The method of claim 1, further comprising performing a duplicate discard function at a PDCP layer.

9. The method of claim 2
wherein the packet provided to the first logical channel corresponds to a first buffer, and
wherein the duplicate packet provided to the second logical channel corresponds to a second buffer.

10. A wireless device comprising:
one or more processors; and
memory storing instructions that, when executed by the one or more processors, cause the wireless device to:
receive an indication for activation of packet data convergence protocol (PDCP) packet duplication of a radio bearer associated with a first radio link control (RLC) entity and a second RLC entity,
duplicate a packet of the radio bearer,
provide the packet to the first RLC entity,
provide a duplicate packet to the second RLC entity,
receive an uplink grant for the packet of the first RLC entity,
transmit the packet of the first RLC entity based on the uplink grant for the packet of the first RLC entity,
receive an acknowledgement of a successful delivery for the packet of the first RLC entity before receiving an uplink grant for the duplicate packet of the second RLC entity, and
in response to the acknowledgement, discard the duplicate packet of the second RLC entity.

11. The wireless device of claim 10,
wherein to provide the packet to the first RLC entity comprises to provide the packet to a first logical channel associated with the first RLC entity, and
wherein to provide the duplicate packet to the second RLC entity comprises to provide the duplicate packet to a second logical channel associated with the second RLC entity.

12. The wireless device of claim 10, wherein the packet is a PDCP data protocol data unit.

13. The wireless device of claim 10, wherein the instructions, when executed by the one or more processors, further cause the wireless device to receive one or more radio resource control (RRC) messages comprising:
configuration parameters for the radio bearer, and
a first information element indicating that the PDCP packet duplication is configured for transmission of packets of the radio bearer.

14. The wireless device of claim 13, wherein the one or more RRC messages comprise logical channel configuration parameters indicating that:
one or more first cells are first allowed serving cells for a first logical channel associated with the first RLC entity, and
one or more second cells are second allowed serving cells for a second logical channel associated with the second RLC entity.

15. The wireless device of claim 14, wherein the logical channel configuration parameters further indicate that:
the first logical channel is mapped to one or more first transmission durations, and
the second logical channel is mapped to one or more second transmission durations.

16. The wireless device of claim 10, wherein the acknowledgement is at least one of a medium access control layer acknowledgement or an RLC layer acknowledgement or a PDCP layer acknowledgement.

17. The wireless device of claim 11,
wherein the packet provided to the first logical channel corresponds to a first buffer, and
the duplicate packet provided to the second logical channel corresponds to a second buffer.

18. A system comprising:
a base station comprising:
one or more first processors; and
first memory storing first instructions that, when executed by the one or more first processors, cause the base station to transmit an indication for activation of packet data convergence protocol (PDCP) packet duplication of a radio bearer associated with a first radio link control (RLC) entity and a second RLC entity; and
a wireless device comprising:
one or more second processors; and
second memory storing second instructions that, when executed by the one or more second processors, cause the wireless device to:
receive the indication,
duplicate a packet of the radio bearer,
provide the packet to the first RLC entity,
provide a duplicate packet to the second RLC entity,
receive an uplink grant for the packet of the first RLC entity,
transmit the packet of the first RLC entity based on the uplink grant for the packet of the first RLC entity,
receive an acknowledgement of a successful delivery for the packet of the first RLC entity before receiving an uplink grant for the duplicate packet of the second RLC entity, and
in response to the acknowledgement, discard the duplicate packet of the second RLC entity.

* * * * *